(12) United States Patent
Yamahata et al.

(10) Patent No.: US 9,749,484 B2
(45) Date of Patent: Aug. 29, 2017

(54) INFORMATION PROCESSING DEVICE, CONTROL METHOD OF INFORMATION PROCESSING DEVICE, PROGRAM, AND IMAGE PROCESSING SYSTEM

(71) Applicant: Konica Minolta, Inc., Chiyoda-ku, Tokyo (JP)

(72) Inventors: Taketoshi Yamahata, Toyokawa (JP); Hiroaki Sugimoto, Nagoya (JP); Yoshikazu Takesada, Hyogo (JP); Yusuke Shinosaki, Toyokawa (JP); Hiroyuki Ohno, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/956,691

(22) Filed: Dec. 2, 2015

(65) Prior Publication Data
US 2016/0165080 A1    Jun. 9, 2016

(30) Foreign Application Priority Data
Dec. 8, 2014    (JP) .................................. 2014-247925

(51) Int. Cl.
| H04N 1/00 | (2006.01) |
| H04N 1/32 | (2006.01) |
| G06F 3/12 | (2006.01) |

(52) U.S. Cl.
CPC ....... *H04N 1/00464* (2013.01); *G06F 3/1205* (2013.01); *G06F 3/1253* (2013.01);
(Continued)

(58) Field of Classification Search
USPC ...................................................... 358/1.15
See application file for complete search history.

(56) References Cited

U.S. PATENT DOCUMENTS

2008/0030762 A1* 2/2008 Morita ................. G06F 3/1205
358/1.14

FOREIGN PATENT DOCUMENTS

| JP | 2004-348499 A | 12/2004 |
| JP | 2010-9295 A | 1/2010 |
| JP | 2012-168637 A | 9/2012 |

OTHER PUBLICATIONS

Kazunori et al., Image Forming System and Information Processor, Jan. 14, 2010; Japanese Patent Application Publication JP20100092295 list on IDS provided by Applicant, all pages.*

(Continued)

*Primary Examiner* — Ngon Nguyen
(74) *Attorney, Agent, or Firm* — Buchanan Ingersoll & Rooney PC

(57) ABSTRACT

An information processing device includes: a communication unit that communicates with an image forming apparatus; a storage unit; a receipt unit that receives a setting value of the image forming apparatus; an acquisition unit that acquires information about a state of the image forming apparatus from the image forming apparatus to change setting of the setting value; and a request unit that stores the setting value received by the receipt unit in the storage unit when the image forming apparatus is in a state not allowed for setting a setting value, and requests the image forming apparatus to set the setting value stored in the storage unit when the image forming apparatus shifts to a state allowed for setting a setting value, wherein the setting value is stored in the storage unit by a function of a web browser application program executed by the information processing device.

35 Claims, 14 Drawing Sheets

(52) U.S. Cl.
CPC ....... *G06F 3/1286* (2013.01); *H04N 1/00204* (2013.01); *H04N 1/00477* (2013.01); *H04N 1/00482* (2013.01); *H04N 1/32561* (2013.01); *H04N 2201/0094* (2013.01)

(56) References Cited

OTHER PUBLICATIONS

Hiromoto, Image Forming Apparus Which Be Set From WWW Browser, Dec. 9, 2004, Japanse Patent Application Publication JP2004348499 listed on IDS Provided by Applicant, all pages.*
Office Action (Notice of Reasons for Rejection) issued Jan. 31, 2017 by the Japanese Patent Office in corresponding Japanese Patent Application No. 2014-247925, and English translation of Office Action (9 pages).

* cited by examiner

FIG. 12

| MANAGER SETTING RESERVATION KEY | RESERVATION SETTING ITEM 1 | RESERVATION SETTING ITEM 2 | RESERVATION SETTING ITEM 3 | ... | RESERVATION SETTING ITEM M |
|---|---|---|---|---|---|
| Key 1 | SETTING A | SETTING B | SETTING C | ... | — |
| Key 2 | SETTING L | SETTING M | — | ... | — |
| Key 3 | SETTING R | SETTING S | SETTING T | ... | — |
| Key 4 | SETTING V | SETTING W | — | ... | — |
| ... | ... | ... | ... | ... | ... |
| Key N | SETTING Z | — | — | ... | — |

INFORMATION PROCESSING DEVICE, CONTROL METHOD OF INFORMATION PROCESSING DEVICE, PROGRAM, AND IMAGE PROCESSING SYSTEM

The entire disclosure of Japanese Patent Application No. 2014-247925 filed on Dec. 8, 2014 including description, claims, drawings, and abstract are incorporated herein by reference in its entirety.

BACKGROUND OF THE INVENTION

Field of the Invention

The present disclosure relates to an information processing device, a control method of an information processing device, a program, and an image processing system, and more particularly to an information processing device which transmits setting information to an image forming apparatus, a control method of this information processing device, a program executed by this information processing device, and an image processing system including this information processing device.

Description of the Related Art

There has been a technology recently in use, which changes settings of an image forming apparatus through operation of an information processing device communicatively connected with the image forming apparatus. For example, JP 2004-348499 A discloses an image forming apparatus utilizing this type of technology. According to this reference, the image forming apparatus receives setting information from a host terminal connected with the image forming apparatus via a network. The image forming apparatus changes its settings based on the received setting information. When determining that an adverse effect may be produced as a result of a setting change based on the received setting information during execution of control, the image forming apparatus does not change the settings.

When the image forming apparatus is configured not to change settings during a certain operation even after reception of setting information as in the case of the image forming apparatus disclosed in JP 2004-348499 A, a user of the information processing device is required to again transmit the setting information to the image forming apparatus. This procedure may be complicated and troublesome for the user.

SUMMARY OF THE INVENTION

The present disclosure has been developed in consideration of these circumstances. It is an object of the present disclosure to reduce a burden imposed on a user of an information processing device in transmission of setting information to an image forming apparatus.

To achieve the abovementioned object, according to an aspect, an information processing device reflecting one aspect of the present invention comprises: a communication unit that communicates with an image forming apparatus; a storage unit; a receipt unit that receives a setting value of the image forming apparatus; an acquisition unit that acquires information about a state of the image forming apparatus from the image forming apparatus to change setting of the setting value; and a request unit that stores the setting value received by the receipt unit in the storage unit when the image forming apparatus is in a state not allowed for setting a setting value, and requests the image forming apparatus to set the setting value stored in the storage unit when the image forming apparatus shifts to a state allowed for setting a setting value, wherein the setting value is stored in the storage unit by a function of a web browser application program executed by the information processing device.

The communication unit is preferably capable of receiving information for allowing storage of the setting value from the image forming apparatus, and the request unit preferably discards the setting value received by the receipt unit without storing the setting value in the storage unit when the information for allowing storage of the setting value is not received from the image forming apparatus in a condition that the image forming apparatus is in a state not allowed for setting a setting value.

The communication unit is preferably capable of receiving information for allowing storage of the setting value from the image forming apparatus, and when the setting value contains a setting value associated with a setting item for which information for allowing storage of this setting item is not received from the image forming apparatus, in a condition that the image forming apparatus is in a state not allowed for setting a setting value, the request unit preferably discards the setting value of the setting item received by the receipt unit without storing the setting value in the storage unit.

The request unit is preferably configured to delete storage of the setting value having been received by the receipt unit and stored in the storage unit when the image forming apparatus is requested to set the setting value after the storage of the setting value in the storage unit and a shift of the image forming apparatus to a state allowed for setting a setting value.

The request unit is preferably configured to give a notification that the setting value has been stored in the storage unit.

To achieve the abovementioned object, according to an aspect, a control method of an information processing device that includes a storage unit and communicates with an image forming apparatus, the method reflecting one aspect of the present invention comprises: a step of receiving a setting value of the image forming apparatus; a step of acquiring information about a state of the image forming apparatus from the image forming apparatus to change setting of the setting value; and a step of storing the received setting value in the storage unit when the image forming apparatus is in a state not allowed for setting a setting value, and requesting the image forming apparatus to set the setting value stored in the storage unit when the image forming apparatus shifts to a state allowed for setting a setting value, wherein the setting value is stored in the storage unit by a function of a web browser application program executed by the information processing device.

To achieve the abovementioned object, according to an aspect, a non-transitory recording medium storing a computer readable program, reflecting one aspect of the present invention, executed by a computer that controls an information processing device including a storage unit and communicating with an image forming apparatus, under the program the computer executing: a step of receiving a setting value of the image forming apparatus; a step of acquiring information about a state of the image forming apparatus from the image forming apparatus to change setting of the setting value; and a step of storing the received setting value in the storage unit when the image forming apparatus is in a state not allowed for setting a setting value, and requesting the image forming apparatus to set the setting value stored in the storage unit when the image forming apparatus shifts to a state allowed for setting a setting value, wherein the setting value is stored in the storage unit by a function of a web browser application program executed by the information processing device.

The setting value is preferably discarded without storage in the storage unit when information for allowing storage of the setting value is not received from the image forming apparatus in a condition that the image forming apparatus is in a state not allowed for setting a setting value.

When the setting value contains a setting value associated with a setting item for which information for allowing storage of this setting item is not received from the image forming apparatus, in a condition that the image forming apparatus is in a state not allowed for setting a setting value, the setting value of the setting item is preferably discarded without storing the setting value in the storage unit.

Under the program, the computer further preferably executes a step of deleting the setting value having been stored in the storage unit when the image forming apparatus is requested to set the setting value stored in the storage unit.

Under the program, the computer further preferably executes a step of giving a notification that the setting value has been stored in the storage unit.

To achieve the abovementioned object, according to an aspect, an image processing system reflecting one aspect of the present invention comprises: an image forming apparatus; and an information processing device capable of communicating with the image forming apparatus, wherein the information processing device includes a first storage unit, a receipt unit that receives a setting value of the image forming apparatus, an acquisition unit that acquires information about a state of the image forming apparatus from the image forming apparatus to change setting of the setting value, and a request unit that stores the setting value received by the receipt unit in the first storage unit when the image forming apparatus is in a state not allowed for setting a setting value, and requests the image forming apparatus to set the setting value stored in the first storage unit when the image forming apparatus shifts to a state allowed for setting a setting value, the image forming apparatus includes a control unit that transmits information concerning the state of the image forming apparatus to the acquisition unit, which information indicates whether or not the image forming apparatus is in a state not allowed for setting a setting value, and the setting value is stored in the first storage unit by a function of a web browser application program executed by the information processing device.

The acquisition unit preferably inquires the image forming apparatus about the state of the image forming apparatus to change the setting value, the control unit is preferably capable of communicating with the two or more information processing devices, and transmitting allowing information in response to an inquiry from the acquisition unit of the information processing device for allowing only the single information processing device corresponding to a transmission source of the inquiry to store the setting value together with information indicating that the image forming apparatus is in a state not allowed for setting a setting value when the image forming apparatus is in a state not allowed for setting a setting value, and the request unit preferably stores the setting value in the first storage unit in a condition that the allowing information has been received when information transmitted from the control unit indicates that the image forming apparatus is in a state not allowed for setting a setting value, and discards the setting value without storing the setting value in the first storage unit when the allowing information is not received.

The acquisition unit preferably inquires the image forming apparatus about the state of the image forming apparatus to change the setting value, the control unit is preferably capable of communicating with the two or more information processing devices, and transmitting allowing information in response to an inquiry from the acquisition unit about setting of a setting value of a first type setting item for allowing only the single information processing device corresponding to a transmission source of the inquiry to store the setting value of the first type setting item when the image forming apparatus is in a state not allowed for setting a setting value, and the request unit preferably stores the setting value of the first type setting item in the first storage unit in a condition that the allowing information concerning the first type setting item has been received when information transmitted from the control unit indicates that the image forming apparatus is in a state not allowed for setting the setting value of the first type setting item, and discards the setting value without storing the setting value of the first type setting item in the first storage unit when the allowing information concerning the first type setting item is not received.

The image forming apparatus preferably includes a second storage unit, and the control unit is preferably configured to store reservation information indicating that the allowing information has been transmitted to the information processing device, and delete from the second storage unit the reservation information corresponding to a request for setting the setting value stored in the first storage unit when the request is received from the information processing device to which the allowing information has been transmitted.

The request unit is preferably configured to delete the setting value having been stored in the first storage unit when the image forming apparatus is requested to set the setting value stored in the first storage unit.

The request unit is preferably configured to give a notification that the setting value has been stored in the first storage unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 12 is a view illustrating an example of a management table of manager setting reservation keys managed by an MFP according to a third embodiment;

DESCRIPTION OF THE PREFERRED EMBODIMENTS

Hereinafter, an information processing device according to an embodiment of the present invention will be described with reference to the drawings. However, the scope of the invention is not limited to the illustrated examples. In the following description, similar components and constituent elements have been given similar reference numbers. These components and constituent elements have been given similar names, and perform similar functions. Accordingly, the same description concerning these components and constituent elements are not repeated herein.

First Embodiment

<Outline of Processes Executed by Image Processing System>

Figure 1:
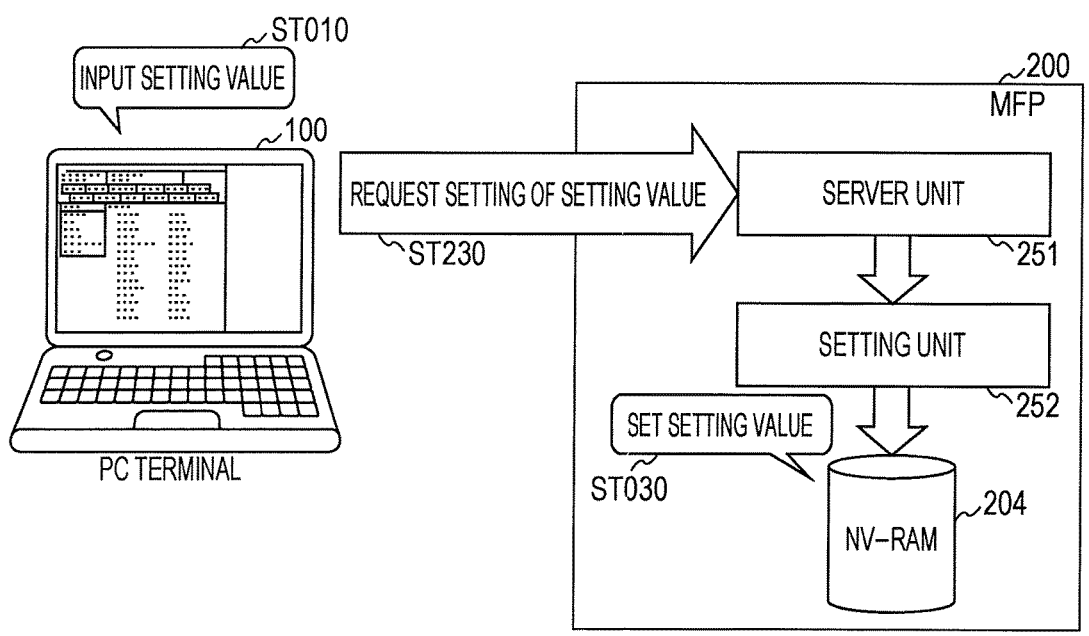
FIG. 1 is a view illustrating an outline of an example of a process executed by an image processing system including an information processing device according to the present disclosure.

FIG. 1 is a view illustrating an outline of an example of processes executed by an image processing system including an information processing device according to the present disclosure. FIG. 1 illustrates a PC terminal 100 corresponding to an information processing device according to an embodiment, and an MFP 200 corresponding to an image forming apparatus according to an embodiment. The PC terminal 100 is connected to a network (LAN: local area network), and communicates with the MFP 200 similarly connected to the network. Processes executed by the image processing system, such as "ST010", are included in FIG. 1.

Referring to FIG. 1, the PC terminal 100 of the image processing system receives information (setting value) for setting a state of the MFP 200 as indicated by step ST010. Examples of the setting value include an upper limit of the number of printing sheets printable by the MFP 200, an item of the state of the MFP 200 about which a manager is to be notified, and a frequency of this notification, for example. The PC terminal 100 having received this setting value transmits the setting value to the MFP 200, and requests the MFP 200 to set the setting value as indicated by step ST020. In response to this request, the MFP 200 sets the setting value transmitted from the PC terminal 100 in an NV-RAM 204 as indicated by step ST030. As a result, setting contents input to a web browser of the PC terminal 100 are reflected in the MFP 200.

FIG. 1 illustrates a function of the MFP 200 to describe a process for reflecting setting contents in the MFP 200. The MFP 200 has an HTTP (hypertext transfer protocol) server function. A server unit 251 illustrated in FIG. 1 corresponds to a section realizing the server function. The server unit 251 of the MFP 200 receives a request from the PC terminal 100.

The MFP 200 includes the NV-RAM (non-volatile random-access memory) 204 for storing various setting values of the MFP 200. Various types of hardware contained in the MFP 200 are operable with reference to the setting values stored in the NV-RAM 204.

The MFP 200 has a function for setting (reflecting) a setting value for the NV-RAM 204. A setting unit 252 illustrated in FIG. 1 corresponds to a section for realizing this function. The setting unit 252 writes the setting value received by the server unit 251 to the NV-RAM 204, or rewrites a setting value stored in the NV-RAM 204 to the received setting value, to reflect the received setting value in the MFP 200.

Figure 2:
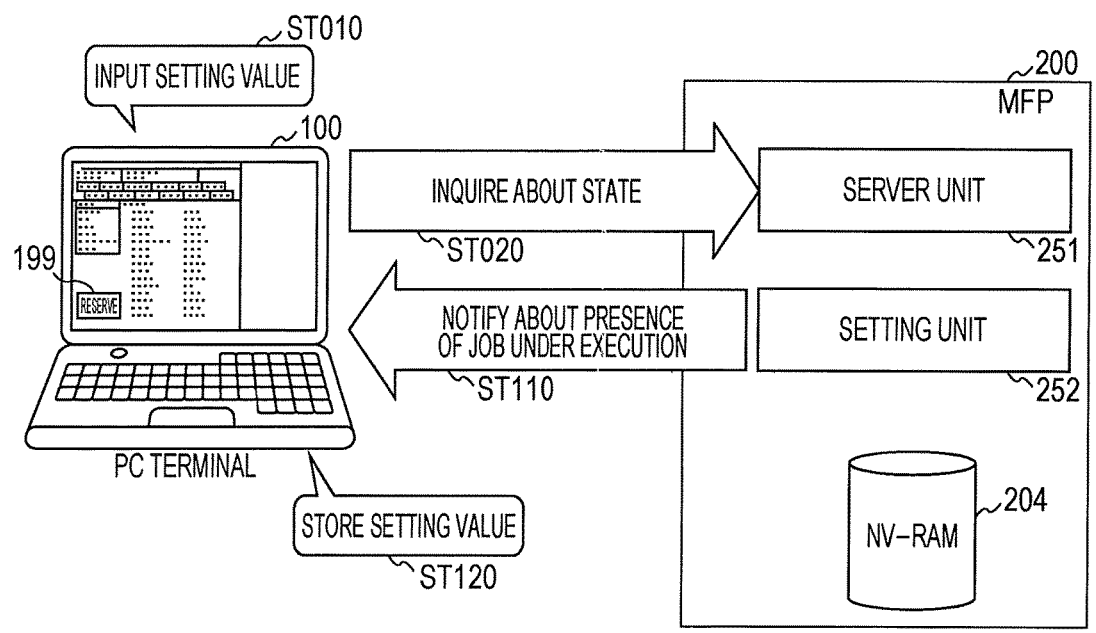
FIG. 2 is a view illustrating another processing mode of the example of the process illustrated in FIG. 1.
Figure 3:
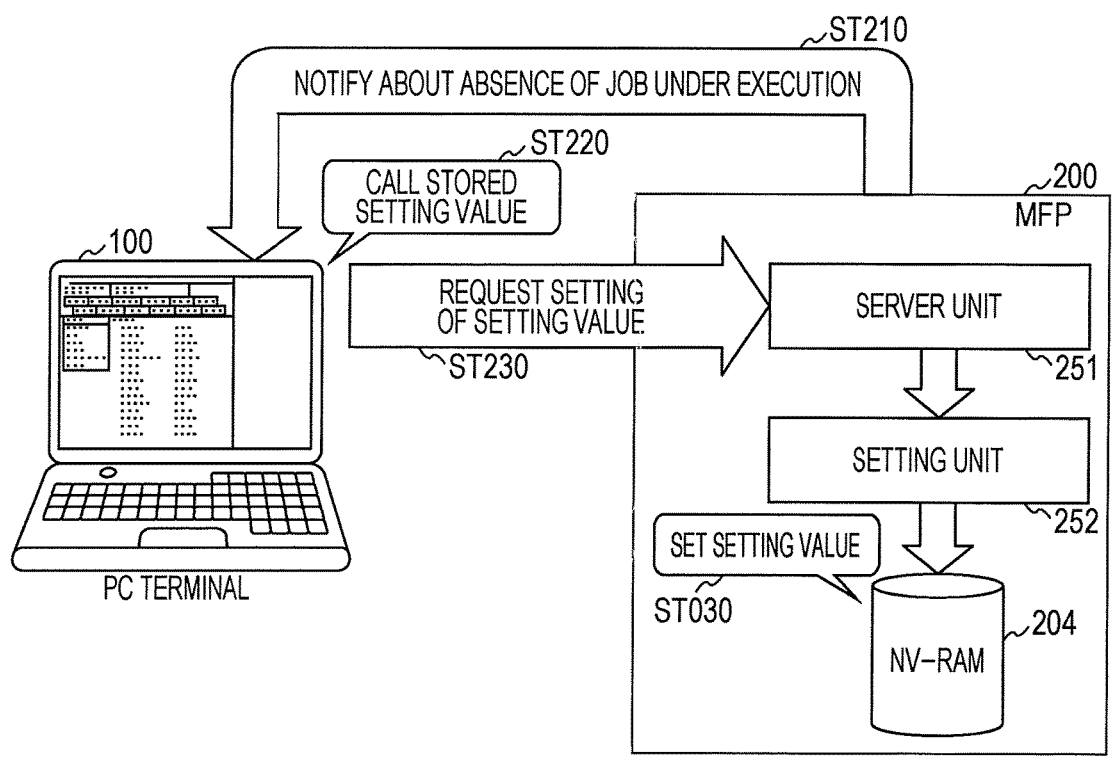
FIG. 3 is a view illustrating a further processing mode of the example of the process illustrated in FIG. 1.

When the MFP 200 is in a particular state, a process different from the process illustrated in FIG. 1 is executed. More specifically, the PC terminal 100 inquires the MFP 200 about whether or not the MFP 200 is in a state allowed for setting a setting value before requesting the MFP 200 to set a setting value. When the MFP 200 is in a state allowed for setting a setting value, the PC terminal 100 requests the MFP 200 to set the setting value. However, when the MFP 200 is in a state not preferable for setting of a new setting value at the time of a request for setting the setting value for the MFP 200, the PC terminal 100 executes processes illustrated in FIGS. 2 and 3 in place of the process illustrated in FIG. 1. FIGS. 2 and 3 are views illustrating processing modes other than the example of the process illustrated in FIG. 1.

When a setting value is input to the PC terminal 100 (step ST010), the PC terminal 100 inquires the MFP 200 about whether or not the MFP 200 is in a state allowed for setting a setting value (step ST020) as illustrated in FIG. 2. When the MFP 200 is in a state not preferable for setting a new setting value, the MFP 200 notifies the PC terminal 100 about this condition as indicated by step ST110. As an example of the state not preferable for setting a new setting value, FIG. 2 illustrates a state that the MFP 200 is executing a job. In this case, the PC terminal 100 is notified by the MFP 200 about the condition that the MFP 200 is executing a job in step ST110.

Based on this response, the PC terminal 100 stores the setting value as indicated by step ST120. For example, this storage is realized by using the function of the web browser. According to the PC terminal 100, the state that the input setting value has been stored in the PC terminal 100 is shown by display of an icon 199 on the display of the browser, for example.

Processes executed hereinafter are described with reference to FIG. 3. When the PC terminal 100 storing the setting value as discussed above again shifts to a state communicative with the MFP 200 after communication cutoff from the MFP 200, the PC terminal 100 acquires a current state of the MFP 200. More specifically, the MFP 200 notifies the PC terminal 100 about the current state of the MFP 200 as indicated by step ST210. As an example of the state notified at this time, FIG. 3 illustrates a state that the MFP 200 is not executing a job.

When the notification does not indicate that the MFP 200 is in a state not preferable for setting a new setting value, i.e., the MFP 200 is in a state preferable for setting a new setting value, the PC terminal 100 calls the setting value stored in step ST120 as indicated by step ST220. Then, the PC terminal 100 requests the MFP 200 to set the setting value as indicated by step ST230. In response to this request, the MFP 200 sets the setting value transmitted from the PC terminal 100 in an NV-RAM 204 as indicated by step ST030.

This process changes setting contents stored in the MFP 200 to the setting contents input to the PC terminal 100. On the other hand, the PC terminal 100 deletes the stored setting value, and ends display of the icon 199 illustrated in FIG. 2, which has been displayed by the web browser.

As described with reference to FIGS. 2 and 3, the PC terminal 100 temporarily stores a setting value when the MFP 200 is in a state not preferable for setting a new setting value at the time of inquiry from the PC terminal 100 about the state of the MFP 200 in response to input of the setting value from the user. Then, the PC terminal 100 again inquires the MFP 200 about the state of the MFP 200 for setting the setting value. When the MFP 200 is in a state preferable for setting a new setting value, the MFP 200 gives a response indicating this state to the PC terminal 100. Based on this response, the PC terminal 100 requests the MFP 200 to set the setting value. In response to this request, the MFP 200 sets the setting value.

Accordingly, the PC terminal 100 is capable of securely setting the setting value for the MFP 200 without the necessity for again inputting the setting value by the user even when the MFP 200 is in a state not preferable for setting a new setting value at the time of input of the setting value by the user. The PC terminal 100 inquires the MFP 200 about whether or not the MFP 200 is in a state allowed for setting a setting value at the time of input of the setting value to the PC terminal 100 from the user, and requests the MFP 200 to set the setting value when the MFP 200 is in a state allowed for setting the setting value.

According to the image processing system, the "state of the MFP 200 not preferable for setting a new setting value" in this context is a state that the MFP 200 is in a state not allowed for setting a setting value. For example, this state includes a state that the MFP 200 is executing a job, a state that an operation for changing settings of the MFP 200 is being input to the MFP 200, a state that an abnormal condition such as a paper jam is being caused in the MFP 200, a state that the MFP 200 is difficult to communicate with the PC terminal 100, and various types of like states.

<Hardware Configuration>

Figure 4:
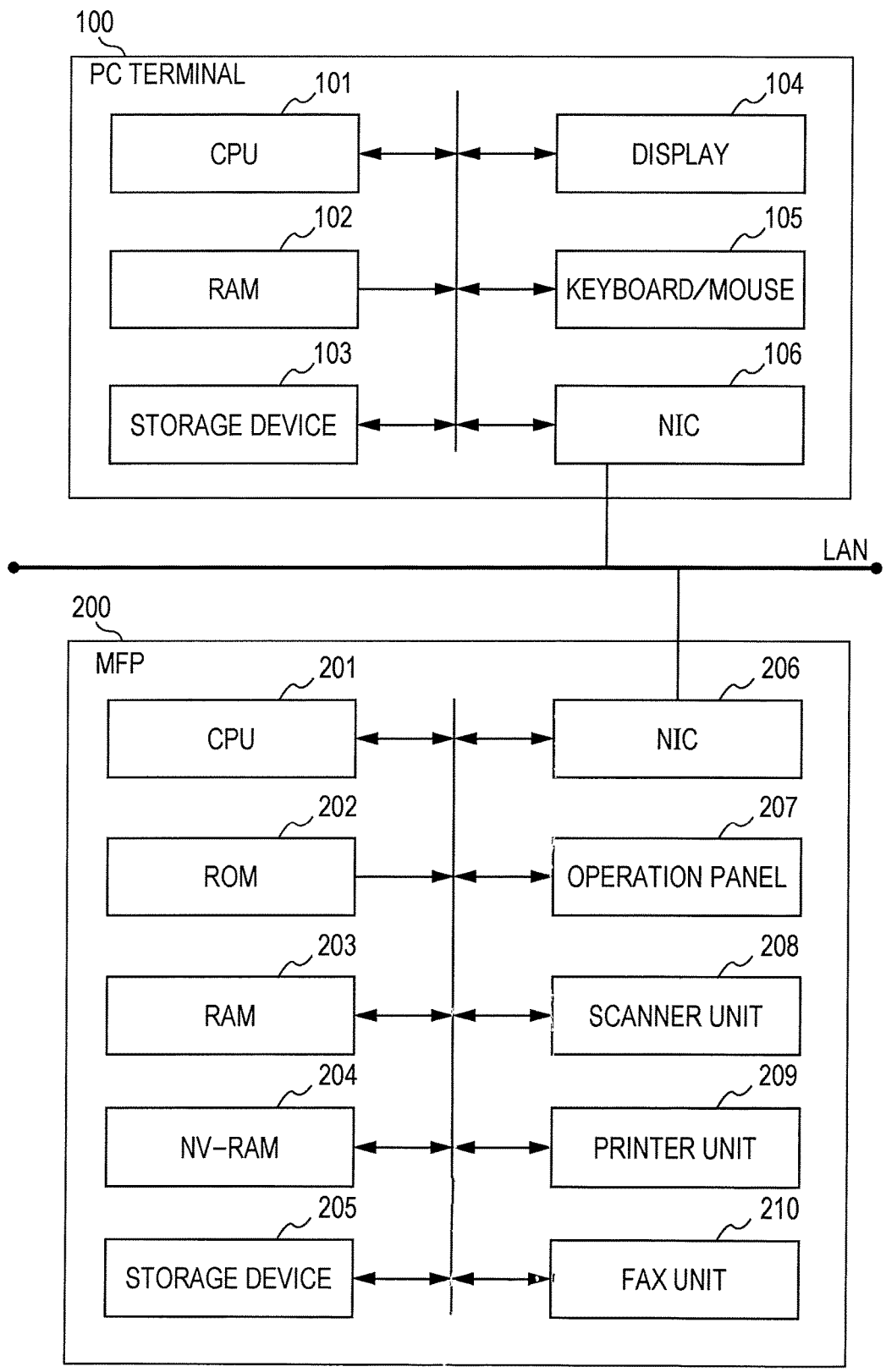
FIG. 4 is a view illustrating an example of a hardware configuration of a personal computer (PC) terminal and an MFP (multi-functional peripheral) included in the image processing system according to a first embodiment.

FIG. 4 is a view illustrating an example of hardware configurations of the PC terminal 100 and the MFP 200 included in the image processing system according to the first embodiment. The hardware configurations of the PC terminal 100 and the MFP 200 are hereinafter described one by one.

(PC Terminal 100)

As illustrated in FIG. 4, the PC terminal 100 includes, as chief constituent elements, a CPU (central processing unit) 101, a RAM (random access memory) 102, a storage device 103, a display 104, a keyboard/mouse 105, and an NIC (network interface card) 106. The CPU 101, the RAM 102, the storage device 103, the display 104, the keyboard/mouse 105, and the NIC 106 are connected with each other via an internal bus.

The CPU 101 is an example of an arithmetic unit which executes processes for controlling overall operation of the PC terminal 100.

The RAM 102 functions as a work area when the CPU 101 executes the processes. The storage device 103 stores various types of data including programs such as an OS (operating system) and web browser applications executed by the CPU 101, and data used for executing these programs. For example, the storage device 103 is constituted by a storage medium for storing data in a non-volatile manner, such as a CD-ROM (compact disc read-only memory), a DVD-ROM (digital versatile disk read-only memory), a USB (universal serial bus) memory, a memory card, an FD (flexible disk), a hard disk, an SSD (solid state drive), a magnetic tape, a cassette tape, an MO (magnetic optical disc), an MD (mini disc), an IC (integrated circuit) card (excluding memory card), an optical card, a mask ROM, an EPROM (erasable programmable read-only memory), and an EEPROM (electronically erasable programmable read-only memory). In addition, the storage device 103 may store programs downloaded via a network and installed in the storage device 103.

The display 104 is a display device for displaying images formed under a program of the web browser or the like.

The keyboard/mouse 105 is an example of an input device through which information is input to the PC terminal 100, such as a setting value input under the web browser.

The NIC 106 is an example of an information transmitting and receiving device provided on the PC terminal 100 for exchange information with the MFP 200.

Chief functions of the PC terminal 100 according to the first embodiment are realized by the CPU 101 executing a program of the web browser. In other words, functions realized by the CPU 101 executing the program of the web browser include: a receipt unit that receives a setting value of the image forming apparatus; an acquisition unit that acquires information about a state of the image forming apparatus from the image forming apparatus to change setting of the setting value; and a request unit that stores the setting value received by the receipt unit in the storage unit when the image forming apparatus is in a state not allowed for setting a setting value, and requests the image forming apparatus to set the setting value stored in the storage unit when the image forming apparatus shifts to a state allowed for setting a setting value.

(MFP 200)

The MFP 200 includes a CPU 201, a ROM 202, a RAM 203, the NV-RAM 204, a storage device 205, an NIC 206, an operation panel 207, a scanner unit 208, a printer unit 209, and a facsimile (FAX) unit 210. The CPU 201, the ROM 202, the RAM 203, the NV-RAM 204, the storage device 205, the NIC 206, the operation panel 207, the scanner unit 208, the printer unit 209, and the FAX unit 210 are connected with each other via an internal bus.

The CPU 201 is an arithmetic device which executes processes for controlling overall operation of the MFP 200.

The ROM 202 stores various types of data including programs executed by the CPU 201. The RAM 203 functions as a work area when the CPU 201 executes the programs. The RAM 203 also has a function of temporarily storing image data or the like read by the scanner unit 208.

The NV-RAM 204 is a non-volatile memory which stores setting values associated with operation of the MFP 200.

The storage device 205 stores destination information registered in the MFP 200, and various types of data such as documents. The data of the documents may be input to the MFP 200 via a network, or may be generated by the scanner unit 208 based on images read by the scanner unit 208.

The NIC 206 is an example of an information transmitting and receiving device provided on the MFP 200 for exchange of information with the PC terminal 100.

The operation panel 207 receives input of various types of information, such as setting values concerning copy image quality or copy sheet, and information for registering or selecting scanning destination (destination registration). A liquid crystal display unit is provided on the surface of the operation panel 207, for example. For example, a touch panel is laminated on the liquid crystal display unit. The operation panel 207 displays setting contents of the MFP 200, for example.

The scanner unit 208 scans a document set thereon, and generates image data of the document. Generation of Image data by the scanner unit 208 may be realized by using a known method, wherefore detailed explanation in this point is not repeated herein.

The printer unit 209 is a device which converts image data read by the scanner unit 208, print data transmitted from an external information processing device such as the PC terminal 100, and FAX data received by the FAX unit 210 into data for printing, and prints an image of a document or the like based on the converted data by using an electrophotographic method. The mode for image formation such as an electrophotographic method may be selected from known technologies, wherefore detailed description in this point is not repeated herein.

The FAX unit 210 transfers image data read by the scanner unit 208 to an external device via a public line. The method for transfer may be selected from known technologies, wherefore detailed explanation in this point is not repeated herein.

The CPU 201 of the MFP 200 functions as the server unit 251 by executing a server program.

The CPU 201 has a function for controlling operation of the MFP 200 by executing a predetermined program, in addition to the function as the server unit 251. From this viewpoint, the CPU 201 functions as a control unit of the MFP 200. The CPU 201 as the control unit is capable of detecting respective states of various components contained in the MFP 200, such as the printer unit 209 and the scanner unit 208. The CPU 201 detects whether the printer unit 209 and the scanner unit 208 are executing a job, whether a paper jam is caused in the printer unit 209, and whether the user has logged in to the network system as a manager through the operation panel 207, for example, and determines whether or not the MFP 200 is in a state not preferable for setting a new setting value based on the detection.

The server unit 251 of the MFP 200 inquires the control unit about whether or not the MFP 200 is in a state not preferable for setting a new setting value in response to an inquiry from the PC terminal 100 (step ST020 in FIG. 2). In this case, the CPU 201 as the control unit determines the state of the MFP 200 in the manner discussed above, and notifies the server unit 251 about the determination result. Based on this notification, the server unit 251 notifies the PC terminal 100 about the state of the MFP 200. In other words, the control unit of the MFP 200 notifies the PC terminal 100 about the state of the MFP 200 via the server unit 251.

The CPU 201 as the control unit also functions as the setting unit 252 by executing a predetermined program.

<Flow of Processes>

Figure 5:
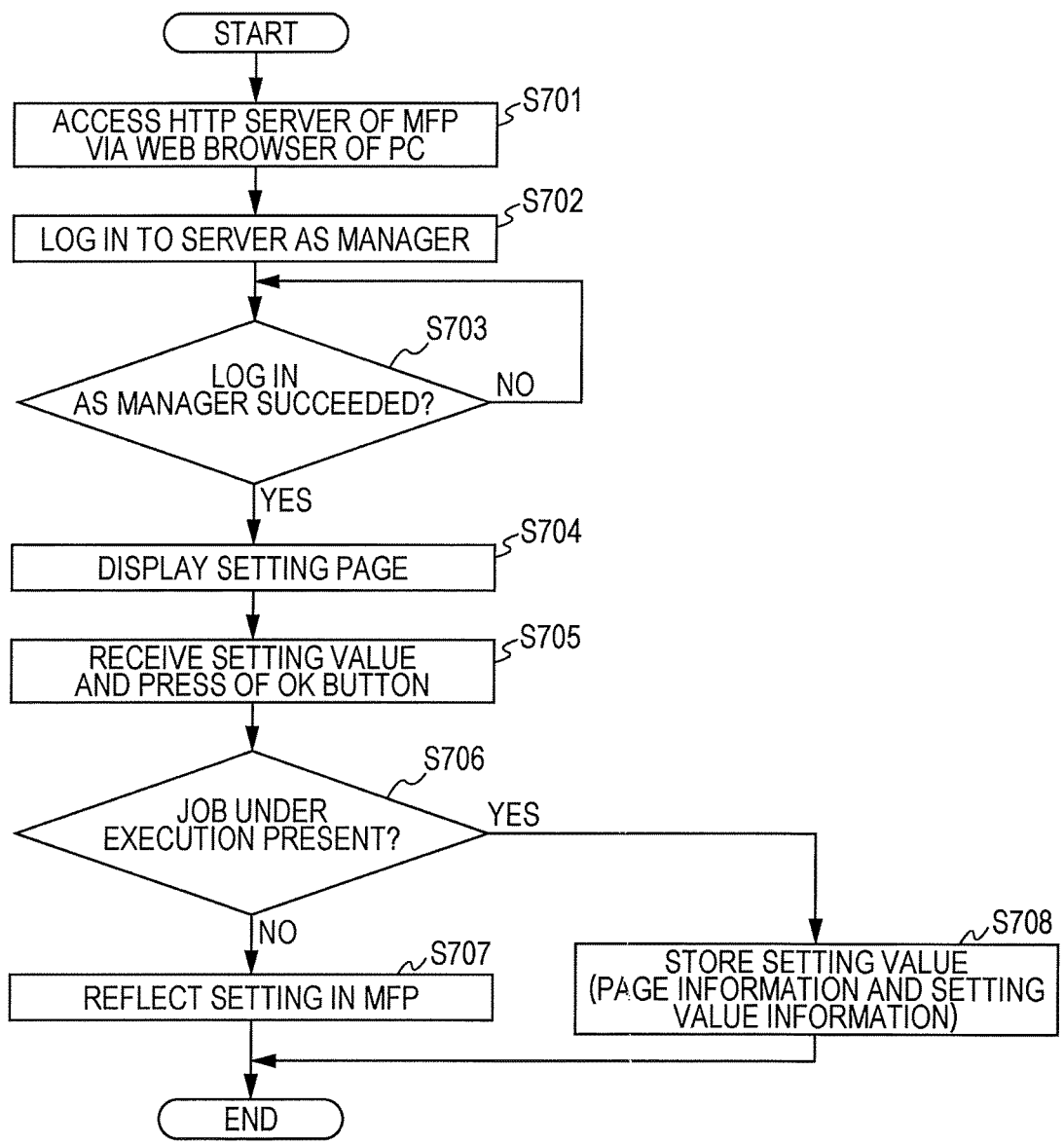
FIG. 5 is a flowchart of a process executed by the PC terminal according to the first embodiment.
Figure 6:
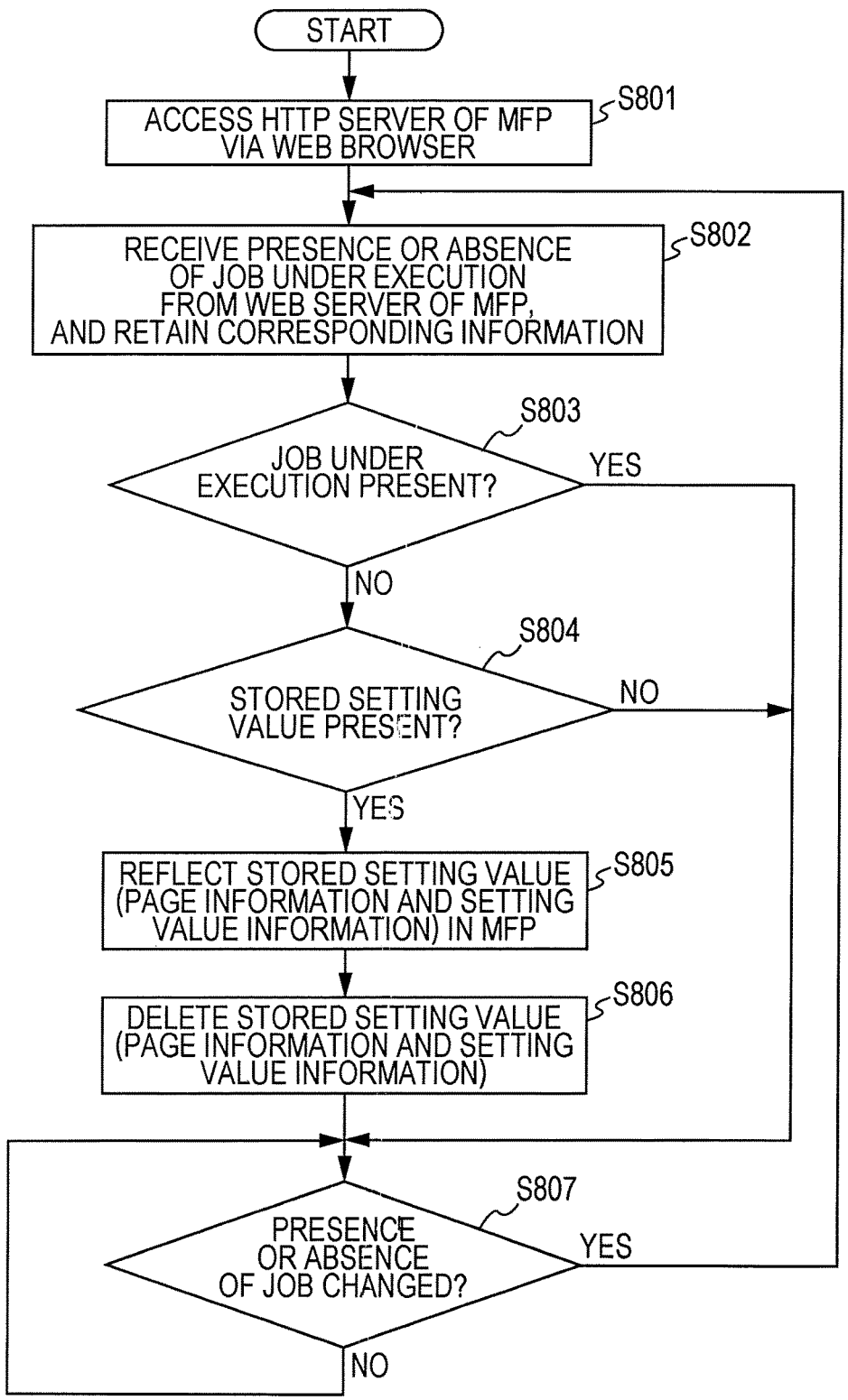
FIG. 6 is a flowchart illustrating a process executed by the PC terminal according to the first embodiment.

Specific flows of processes executed by the PC terminal 100 as described above with reference to FIGS. 1 through 3 are hereinafter described. FIGS. 5 and 6 are flowcharts of processes executed by the PC terminal 100 according to the first embodiment. The processes illustrated in FIGS. 5 and 6 are realized by the CPU 101 of the PC terminal 100 executing an application program of the web browser, for example. It is assumed in the first embodiment that log-in to the network system with authorization as a manager is required for setting a setting value of the MFP 200.

FIG. 5 illustrates a process executed by the PC terminal 100 when the web browser of the PC terminal 100 receives input of a setting value of the MFP 200 from the user. FIG. 6 illustrates a process executed by the PC terminal 100 when the setting value temporarily stored in the PC terminal 100 is set for the MFP 200. The process illustrated in FIG. 5 is initially described.

In step S701, the CPU 101 accesses an HTTP server (server unit 251) of the MFP 200 in response to an operation input from the user. Then, the control advances to step S702.

The CPU 101 having received a manager password in step S702 requests log-in to the network system as a manger. This request includes transmission of the manager password to the HTTP server of the MFP 200, for example. In response to this request, the HTTP server determines whether to allow log-in based on the transmitted password, and notifies the web browser about the determination result. Then, the control advances to step S703.

In step S703, the CPU 101 does not advance the control to the step subsequent to step S703 until receiving a notification indicating a success of log-in as a manager from the HTTP server of the MFP 200. When the CPU 101 receives this notification, the control advances to step S704. When receiving a notification indicating a failure of log-in from the HTTP server, the CPU 101 may end the process in FIG. 5. In this case, the user again inputs the manager password. The control restarts from step S701.

In step S704, the CPU 101 displays on the display 104 a page through which a setting value is input. Then, the control advances to step S705.

In step S705, the CPU 101 receives a setting value input to the page displayed in step S704, and receives an operation for confirming the setting value (such as press of OK button). Based on this reception, the CPU 101 inquires the server unit 251 of the MFP 200 about whether or not the MFP 200 is in a state allowed for setting a setting value. The setting value is input to the PC terminal 100 via the keyboard/mouse 105, for example.

In step S706, the CPU 101 receives a notification of the state of the MFP 200 from the server unit 251 of the MFP 200 in response to the inquiry issued in step S705. Then, the CPU 101 advances the control to step S708 when the notification from the MFP 200 indicates that the MFP 200 is executing a job. On the other hand, the CPU 101 advances the control to step S707 when the notification from the MFP 200 indicates that the MFP 200 is not executing a job.

According to this embodiment, the state of "executing a job" is an example of a state of the MFP 200 not preferable for setting a new setting value. Accordingly, in step S706, the control advances to step S708 when the MFP 200 is in a state not preferable for setting a new setting value. However, the control advances to step S707 in the opposite case.

In step S707, the CPU 101 having received the setting value in step S705 reflects the setting value in the MFP 200, and ends the process illustrated in FIG. 5. A program for writing a setting value to the NV-RAM 204 of the MFP 200 is described as a CGI (common gateway interface) program, for example. In step S707, the CPU 101 transmits a request to a predetermined URI (uniform resource identifier) of the HTTP server. In response to this request, the HTTP server starts the foregoing CGI program for writing the setting value to the NV-RAM 204. As a result, the setting value transmitted from the PC terminal 100 is written to the NV-RAM 204.

The MFP 200 may notify the PC terminal 100 about completion of writing of the setting value after the setting value is written to the NV-RAM 204. In this case, the CPU 101 may display a message on the display 104 to indicate completion of setting of the setting value for the MFP 200 in response to reception of this notification. This display may include the setting value input in step S705 to indicate the setting contents in the MFP 200.

On the other hand, the CPU 101 having received the setting value in step S705 stores the setting value in the storage device 103, for example, in step S708, and ends the process illustrated in FIG. 5. More specifically, the CPU 101 stores information for specifying a selected page (page information), and information for specifying the setting value input to this page (setting value information) in the storage device 103 as the setting value in step S708.

As described with reference to FIG. 6, the setting value stored in step S708 is transmitted to the MFP 200 at a later time after the MFP 200 stops execution of the job. In step S708, the CPU 101 may display on the display 104 such a message that the setting value received in step S705 has not been set for MFP 200 yet due to the state of the MFP 200 under execution of a job, that the setting value has been stored in the PC terminal 100, and that the setting value is transmitted to the MFP 200 at a later time when the MFP 200 does not execute a job. Alternatively, the CPU 101 may display on the display 104 a message indicating completion of setting of the setting value in step S708 in place of the foregoing display.

The process illustrated in FIG. 6 is hereinafter described. FIG. 6 illustrates a process executed when the setting value stored in step S708 is set for the MFP 200. It is assumed that the process illustrated in FIG. 6 is executed after completion of the process in FIG. 5 and log-out of the user from the network system.

In step S801, the CPU 101 accesses the HTTP server (server unit 251) of the MFP 200. Then, the control advances to step S802.

In step S802, the CPU 101 acquires a state of the MFP 200 (whether or not the MFP 200 is in a state not preferable for setting a new setting value). The state of the MFP 200 may be acquired by a notification of the state from the MFP 200 in response to an inquiry from the CPU 101, or may be acquired by a notification of the state from the MFP 200 regardless of the presence or absence of an inquiry from the PC terminal 100. Then, the control advances to step S803.

The CPU 101 advances the control to step S807 when the state of the MFP 200 acquired in step S802 indicates that "the MFP 200 is executing a job" in step S803. On the other hand, the CPU 101 advances the control to step S804 when the state of the MFP 200 acquired in step S802 does not indicate that "the MFP 200 is executing a job".

In step S804, the CPU 101 determines whether or not the setting value (page information and setting value information) has been stored in the storage device 103. The setting value stored in the PC terminal 100 in step S708 (see FIG. 5) is kept stored in the storage device 103 until the setting value is deleted in step S806 described below. When it is determined that the setting value has been stored in the storage device 103, the CPU 101 advances the control to step S805. On the other hand, the CPU 101 advances the control to step S807 when it is determined that the setting value has not been stored in the storage device 103.

In step S805, the CPU 101 allows the setting value stored in the storage device 103 to be reflected in the MFP 200 similarly to step S707 (see FIG. 5). The setting value is reflected in the MFP 200 by a CGI process in step S805, for example. Then, the control advances to step S806.

In step S806, the CPU 101 deletes the setting value stored in the storage device 103. Then, the control advances to step S807.

In step S807, the CPU 101 acquires a state concerning execution of a job by the MFP 200 (presence or absence of a job under execution) to determine whether or not the state corresponding to the determination target in step S803 has been changed. The CPU 101 stops the control in step S807 until it is determined that the foregoing change has been made. When it is determined that the change has been made, the CPU 101 returns the control to step S802.

According to the process in FIG. 6 described above, the condition that the MFP 200 is not executing a job is only required when the PC terminal 100 transmits to the MFP 200 the setting value stored in the PC terminal 100 during the process in FIG. 5 in the state that the MFP 200 is executing a job. In this case, transmission of the setting value to the MFP 200 in the process illustrated in FIG. 6 does not require particular operation by the user through the PC terminal 100. More specifically, the PC terminal 100 stores the setting value in the process illustrated in FIG. 5, and then transmits the stored setting value to the MFP 200 without the necessity for retype of the setting value by the user, for example, after the user logs in (step S801) and connects to the network system.

Moreover, the setting value set for the MFP 200 is stored in the PC terminal 100, wherefore an additional storage device is not needed for storing the setting value which is set when the MFP 200 shifts to a state allowed for setting the setting value.

<Storage of Setting Value in PC Terminal 100>

According to the first embodiment, the CPU 101 of the PC terminal 100 stores a setting value in the storage device 103 by using the function of the web browser in step S708 in FIG. 5 when the setting value is difficult to immediately transmit to the MFP 200. The web browser stores the setting value in the storage device 103 by utilizing "Web Storage", for example. "Web Storage" is a local cache function of HTML5. A storage area is allocated to the storage device 103 for each domain of the web server. This storage area is mounted by a local storage of Web Storage, and stores setting values associated with the corresponding domain of the web server.

Alternatively, the CPU 101 may store the setting value in the storage device 103 by utilizing cookie of the web browser (HTTP cookie). In comparison with cookie, "Web Storage" does not establish the term of validity, and sets a higher upper limit for a data amount. (Cookie has an upper limit of 4 KB, while Web Storage has an upper limit of 5 MB.) Accordingly, it is obvious that the use of "Web Storage" is more advantageous than cookie. However, the storage method of the setting value is not limited to the method using the function of the web browser discussed above.

The setting value may be stored by using Key-Value system. Particularly when a setting item indicating the setting value is stored as well as the setting value, both the setting value and the setting item are stored as a "Value" in the Key-Value storage system. For example, for storing "setting value a of setting item A", "Setting 1" is stored as a "Key", while "A=a" is stored as a "Value".

The CPU 101 may give a notification that a setting value has been temporarily stored in the PC terminal 100 by displaying the icon 199 in FIG. 2, for example. In this case, the CPU 101 displays the icon 199 in the period from storage of the setting value in step S708 in FIG. 5 to deletion of the setting value in step S806 in FIG. 6.

Second Embodiment

Figure 7:
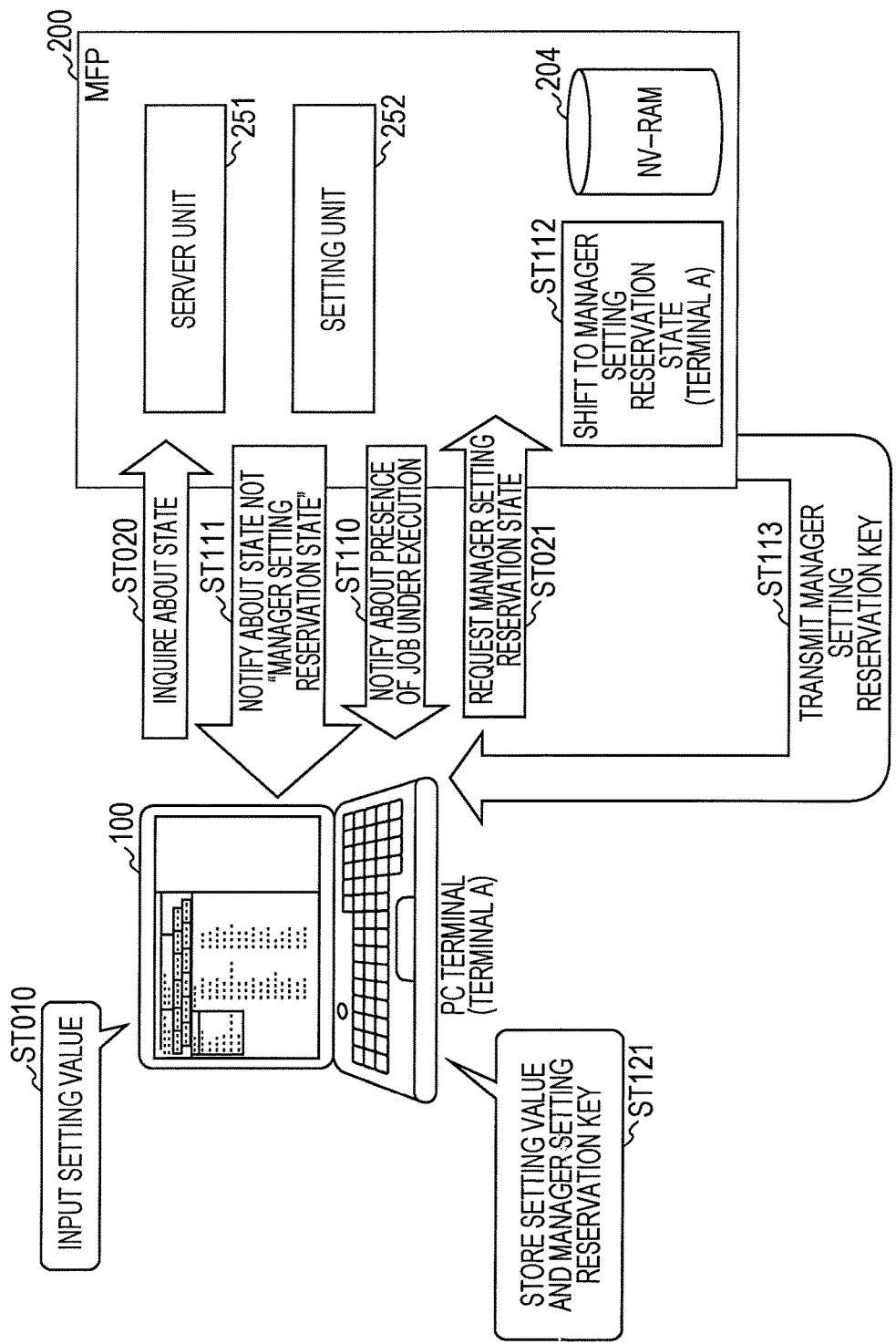
FIG. 7 is a view illustrating a mechanism for storing a setting value only in a single PC terminal when an MFP is in a state not preferable for setting a new setting value in an image processing system according to a second embodiment.
Figure 8:
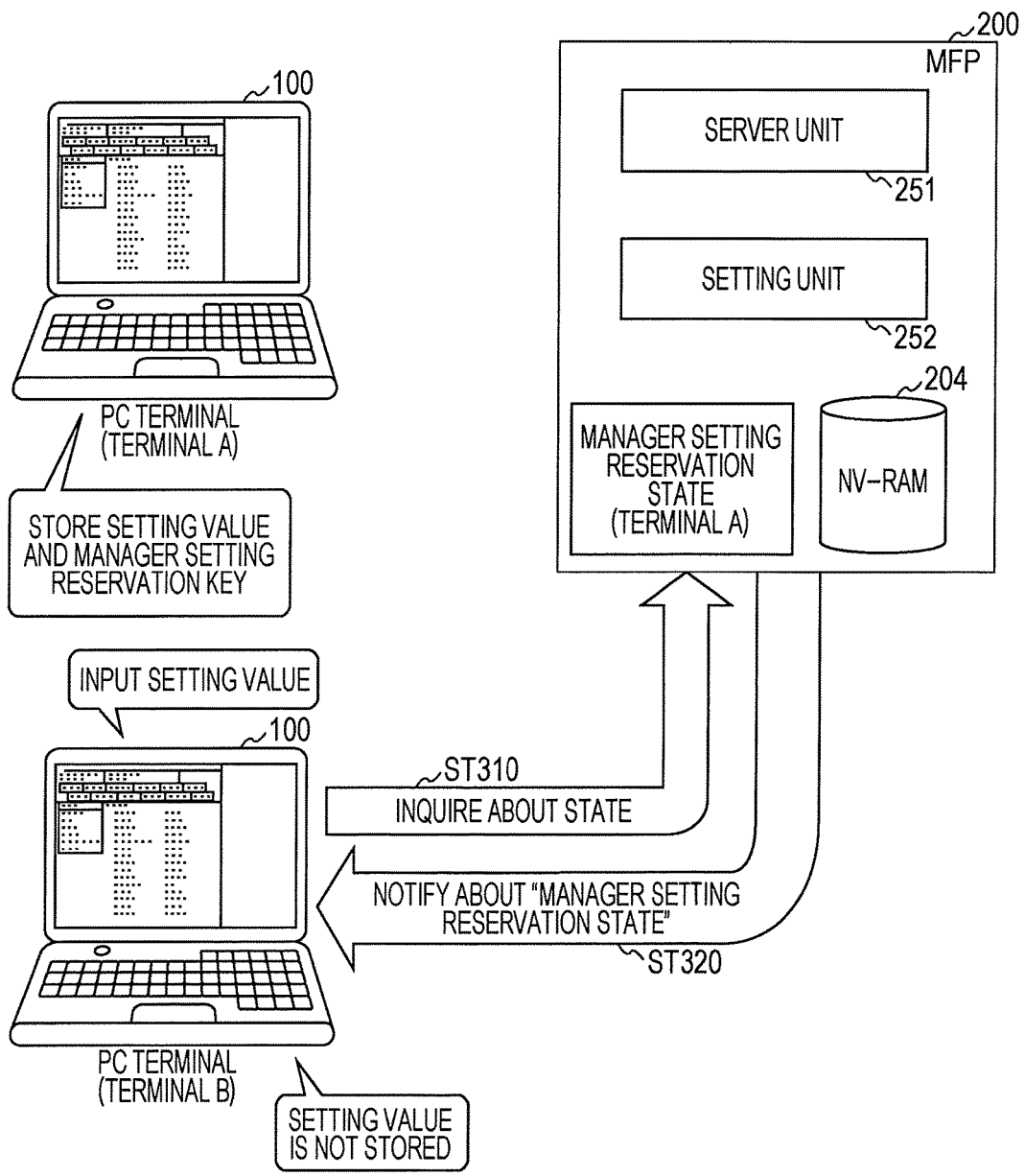
FIG. 8 is a view illustrating a mechanism for storing a setting value only in the single PC terminal when the MFP is in the state not preferable for setting a new setting value in the image processing system according to the second embodiment.
Figure 9:
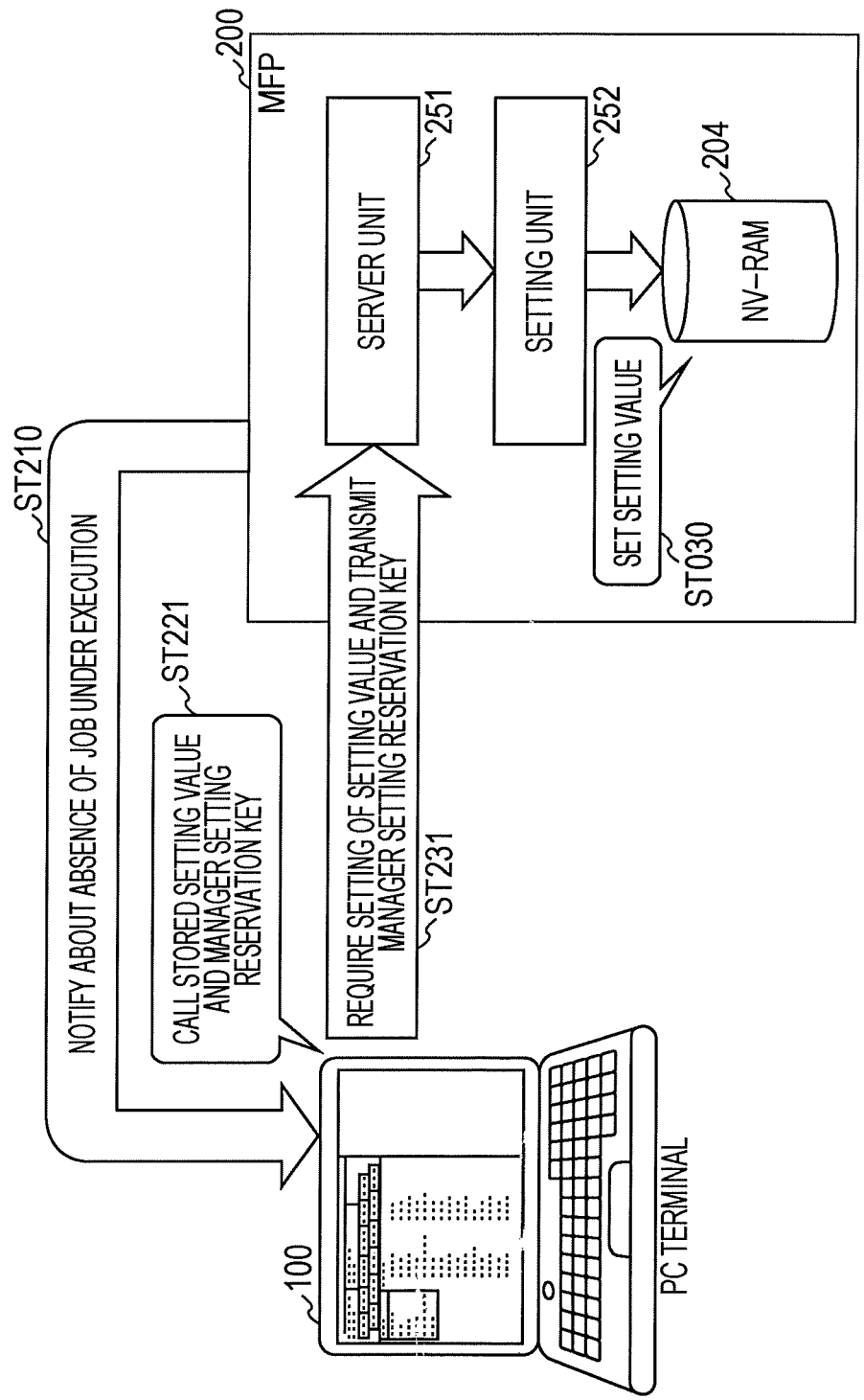
FIG. 9 is a view illustrating a mechanism for storing a setting value only in the single PC terminal when the MFP is in the state not preferable for setting a new setting value in the image processing system according to the second embodiment.

According to a second embodiment, hardware structures of the PC terminal 100 and the MFP 200 of an image processing system may be similar to the corresponding hardware structures in the first embodiment, wherefore the same explanation is not repeated herein.
<Outline of Image Processing System>
The image processing system according to the second embodiment has a mechanism for storing a setting value only in the single PC terminal 100 when the MFP 200 is in a state not preferable for setting a new setting value. FIGS. 7 through 9 are views illustrating this mechanism of the image processing system according to the second embodiment. This mechanism of the second embodiment is hereinafter described with reference to FIGS. 7 through 9.

Initially referring to FIG. 7, the MFP 200 of the image processing system according to the second embodiment receives an inquiry from the PC terminal 100 about a state of the MFP 200 concerning setting of a setting value (step ST020). When the MFP 200 is not in a manager setting reservation state described below, and in a state not preferable for setting a new setting value (steps ST111, ST110), the MFP 200 notifies the PC terminal 100 about this state of the MFP 200.

In response to this notification, the PC terminal 100 requests the MFP 200 to shift to a "manager setting reservation state" (step ST021).

Based on this request, the MFP 200 shifts the "manager setting reservation state" (step ST112), and transmits a "manager setting reservation key" to the PC terminal 100 (step ST113). The MFP 200 associates the manager setting reservation state with the PC terminal 100 having transmitted the inquiry of the state ("terminal A" in FIG. 7).

The PC terminal 100 stores the setting value and the manager setting reservation key (step ST121).

Referring to FIG. 8, the different PC terminal 100 ("terminal B" in FIG. 8) inquires the MFP 200 about the state of the MFP 200 concerning setting of a setting value in the condition that the MFP 200 is in the manager setting reservation state (step ST310). In this case, the MFP 200 notifies this PC terminal 100 about the condition that the MFP 200 is in the manager setting reservation state for the PC terminal 100 indicated as the terminal A (step ST320). When the MFP 200 receives the notification that the MFP 200 is in the manger setting reservation state for the different PC terminal 100, the PC terminal 100 does not store the input setting value but discards the setting value.

Referring to FIG. 9 next, the MFP 200 is currently out of the state not preferable for setting a new setting value. The MFP 200 notifies the PC terminal 100 about this state of the MFP 200 (step ST210). As an example of the "state of the MFP 200 not preferable for setting a new setting value", FIG. 9 illustrates a condition that the MFP 200 is executing a job. Accordingly, a notification indicating that the MFP 200 is not executing a job is given in step ST210.

When receiving the foregoing notification in step ST210, the PC terminal 100 storing the manager setting reservation key calls the manager setting reservation key and the setting value (step ST221), and transmits the manager setting reservation key and the setting value to the MFP 200 (step ST231).

Based on this transmission, the setting value from the PC terminal 100 is set for the NV-RAM 204 of the MFP 200 as indicated by step ST030. As a result, setting contents input to the web browser of the PC terminal 100 are reflected in the MFP 200.

Figure 10:
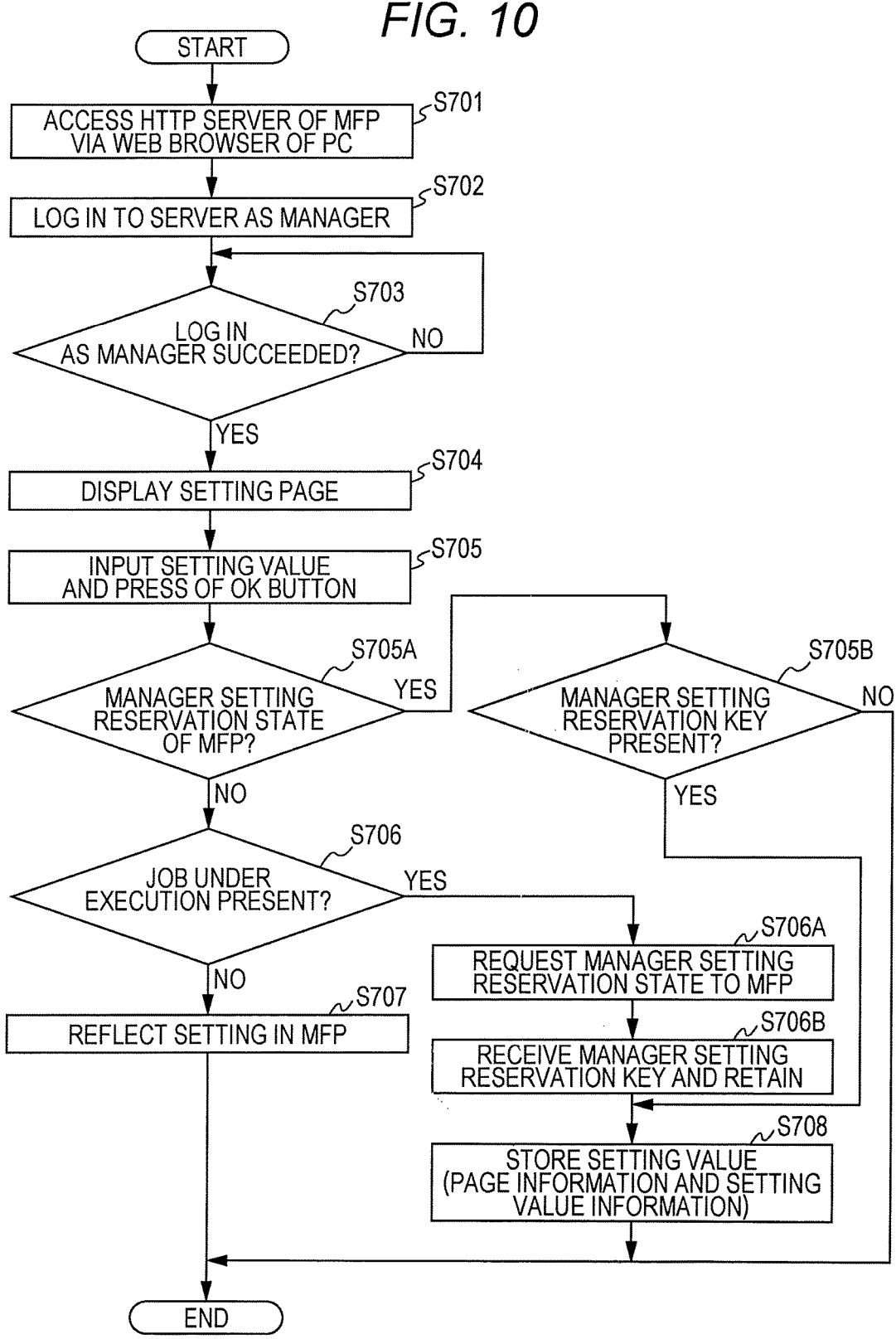
FIG. 10 is a flowchart of a process executed by the PC terminal according to the second embodiment.
Figure 11:
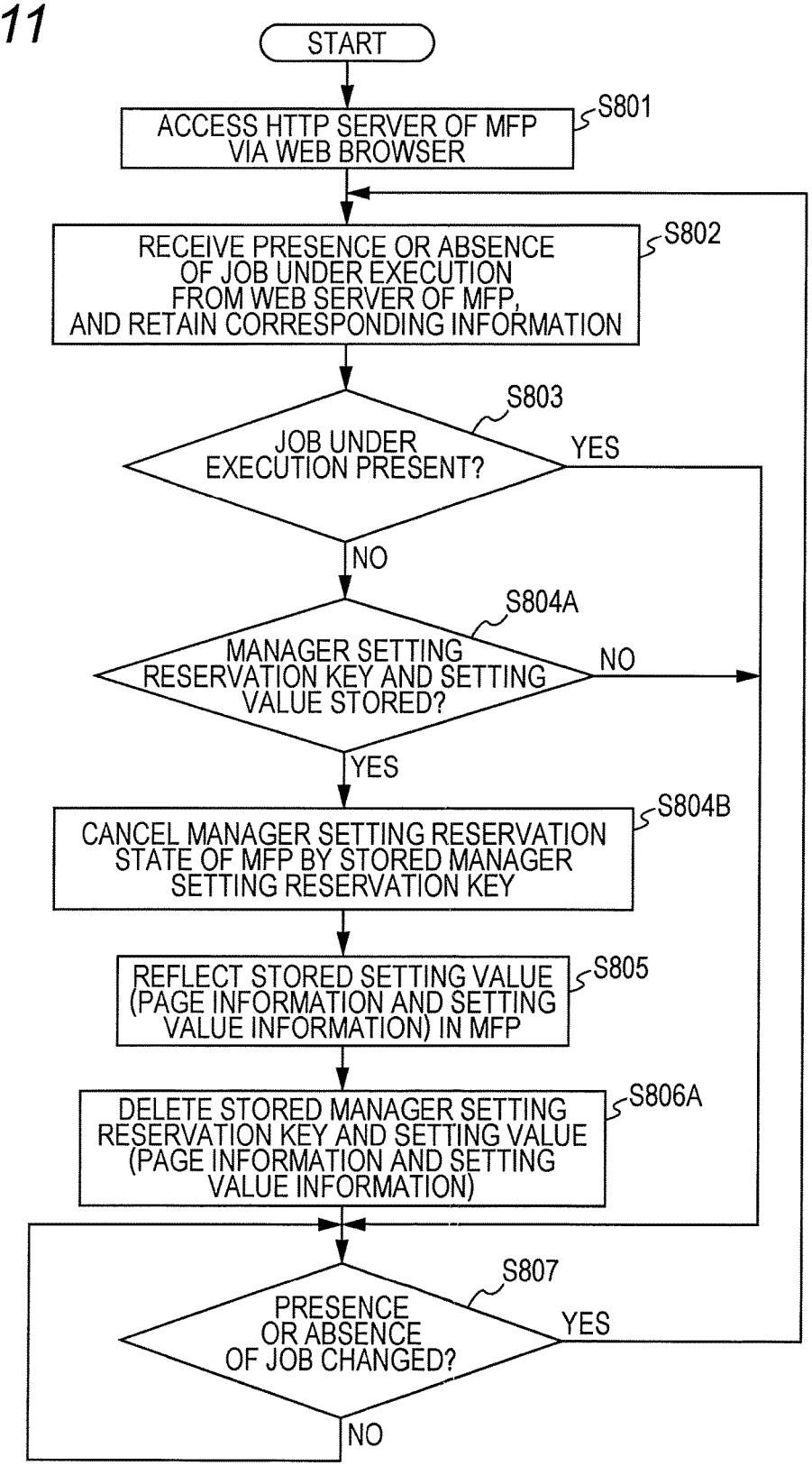
FIG. 11 is a flowchart of a process executed by the PC terminal according to the second embodiment.

After transmitting the manager setting reservation key and the setting value to the MFP 200, the PC terminal 100 deletes the manager setting reservation key. The MFP 200 having received the manager setting reservation key and the setting value cancels the manager setting reservation state of the MFP 200.
<Flow of Processes>
FIGS. 10 and 11 are flowcharts of processes executed by the PC terminal 100 according to the second embodiment. FIG. 10 illustrates a process executed by the PC terminal 100 when the web browser of the PC terminal 100 receives input of a setting value of the MFP 200 from the user. On the other hand, FIG. 11 illustrates a process executed by the PC terminal 100 when the setting value temporarily stored in the PC terminal 100 is set for the MFP 200. The process illustrated in FIG. 10 is initially described. The process in FIG. 10 corresponds to a modified example of the process illustrated in FIG. 5.

Referring to FIG. 10, the CPU 101 executes the control in steps S701 through S704 similarly to the first embodiment. More specifically, the CPU 101 accesses the server in step S701, tries log-in to the system as a manager in step S702, and determines whether or not log-in has succeeded as a manager in step S703. When it is determined that the log-in has succeeded, the CPU 101 advances the control to step S704. The CPU 101 displays on the display 104 a page through which a setting value is input. Then, the control advances to step S705.

In step S705, the CPU 101 receives a setting value input to the page displayed in step S704, and receives an operation for confirming the setting value (such as press of OK button). Based on this reception, the CPU 101 transmits information for inquiry to the server unit 251 of the MFP 200 to inquire about the state of the MFP 200 for setting a setting value. Then, the control advances to step S705A.

According to the first embodiment, the MFP 200 gives a notification indicating whether or not the MFP 200 is in a state not preferable for setting a new setting value in response to the transmission of information in step S705. However, the MFP 200 according to the second embodiment gives a notification indicating whether or not the MFP 200 is in the manager setting reservation state in addition to the foregoing notification.

More specifically, the CPU 101 analyzes the notification from the MFP 200 in step S705A, and determines whether or not the MFP 200 is in the manager setting reservation state. When it is determined that the MFP 200 is in the manager setting reservation state, the CPU 101 advances the control to step S705B. When it is determined that the MFP 200 is not in the manager setting reservation state, the CPU 101 advances the control to step S706.

In step S705B, the CPU 101 determines whether or not the manager setting reservation key of the MFP 200 has been stored in the PC terminal 100 on which the CPU 101 is mounted. When it is determined that the corresponding key has been stored, the CPU 101 advances the control to step S708.

When it is determined that the manager setting reservation state key has not been stored in the PC terminal 100 on which the CPU 101 is mounted in step S705B, the CPU 101 ends the control in this condition. Accordingly, the CPU 101 ends the process in FIG. 10 without storing the setting value received in step S705. This process corresponds to the process for the terminal B illustrated in FIG. 8. More specifically, when the manager setting reservation key is not stored in the PC terminal 100 under the manager setting reservation state of the MFP 200, the MFP 200 is currently in the manger setting reservation state for the different PC terminal 100. In this case, the PC terminal 100 discards the input setting value without storing the input setting value. At the time of discard, the CPU 101 may give a notification indicating the discard of the setting value by displaying a predetermined message or by other methods. For example, the message may say, "Setting value is discarded without transmission to MFP 200. Retype setting value for setting this setting value."

In step S706, the CPU 101 checks the contents of the notification transmitted in response to the request in step S705. When the notification indicates that the MFP 200 is executing a job, the CPU 101 advances the control to step S706A. When the notification indicates that the MFP 200 is not executing a job, the CPU advances the control to step S707.

In step S706A, the CPU 101 transmits to the MFP 200 a request for setting a manager setting reservation state for the MFP 200. This step corresponds to step ST021 in FIG. 7. Then, the control illustrated in FIG. 10 advances to step S706B. The MFP 200 shifts to the manager setting reservation state in accordance with the request (step S112 in FIG. 7), and transmits a manager setting reservation key to the PC terminal 100 (step ST113 in FIG. 7).

In step S706B, the CPU 101 stores the manager setting reservation key transmitted from the MFP 200. Then, the control advances to step S708. In step S706B, the manager setting reservation key is stored in the storage device 103 by using the function of the web browser, for example, similarly to the storage of the setting value in the first embodiment.

In step S708, the CPU 101 stores in the storage device 103 the setting value (page state and setting value information) received in step S705, for example, similarly to the first embodiment, and ends the process illustrated in FIG. 10.

According to the second embodiment, the PC terminal 100 stores the manager setting reservation key transmitted from the MFP 200 and the setting value input in step S705 when the MFP 200 is executing a job not in the state of manager setting reservation at the time of inquiry of the state of the MFP 200 for setting a setting value (step S705A: NO, step S706: YES, steps S706A, S706B, and S708).

When the MFP 200 is in the manager setting state reservation state for the PC terminal 100 at the time of a request from the corresponding PC terminal 100 for setting the setting value for the MFP 200, the PC terminal 100 stores the setting value input in step S705 (step S705A: YES, step S705B: YES, step S708).

When it is determined that the MFP 200 is not executing a job (step S706: NO) not in the state of manager setting reservation (step S705A: NO), the CPU 101 allows the setting value stored in the storage device 103 to be reflected in the MFP 200 similarly to the first embodiment in step S707. In step S707, the setting value is reflected in the MFP 200 by a CGI process, for example. Then, the control illustrated in FIG. 10 ends.

The process illustrated in FIG. 11 is hereinafter described. FIG. 11 illustrates a process executed when the setting value stored in step S708 in FIG. 10 is set for the MFP 200. It is assumed that the process in FIG. 11 is executed after completion of the process in FIG. 10 and log-out of the user from the network system. The process illustrated in FIG. 11 corresponds to a modified example of the process illustrated in FIG. 6.

The CPU 101 executes the control from steps S801 through S803 similarly to the process illustrated in FIG. 6. Then, the CPU 101 advances the control to step S804A when the state of the MFP 200 acquired in step S802 does not indicate that "the MFP 200 is executing a job" in step S803.

In step S804A, the CPU 101 determines whether or not a manager setting reservation key and a setting value (page state and setting information) have been stored in the PC terminal 100 on which the corresponding CPU 101 is mounted. When it is determined that these key and value have been stored, the CPU 101 advances the control to step S804B. When it is determined that these key and value have not been stored, the CPU 101 advances the control to step S807.

In step S804B, the CPU 101 requests the MFP 200 to cancel the manager setting reservation key and the manager setting reservation state. As a result, the manager setting reservation state of the MFP 200 is canceled. Then, the control advances to step S805.

In step S805, the CPU 101 allows the setting value stored in the storage device 103 to be reflected in the MFP 200 similarly to step S707 (see FIG. 10). Then, the control advances to step S806A.

In step S806A, the CPU 101 deletes the manager setting reservation key and the setting value (page state and setting information) stored in the PC terminal 100 on which the corresponding CPU 101 is mounted. Then, the control advances to step S807.

In step S807, the CPU 101 acquires a state concerning execution of a job by the MFP 200 (presence or absence of job under execution), and determines whether or not the state corresponding to the determination target in step S803 has been changed. The CPU 101 stops the control in step S807 until it is determined that the foregoing change has been made. When it is determined that the change has been made, the CPU 101 returns the control to step S802.

According to the process described with reference to FIG. 11, the MFP 200 having received the manager setting reservation key from the PC terminal 100 cancels the manager setting reservation state of the MFP 200. The setting value is reflected in the MFP 200 in accordance with the request from the PC terminal 100 for setting the setting value stored in the corresponding PC terminal 100.

According to the second embodiment, the single PC terminal 100 allowed to store a setting value of the MFP 200 in the state not preferable for setting a new setting value is specified based on a manager setting reservation key. On the other hand, the PC terminal 100 not storing the manager setting reservation key in the condition that the MFP 200 is in the manager setting reservation state is not allowed to store the setting value of the MFP 200.

Information indicating whether or not the MFP 200 is in the manager setting reservation state (such as a value of a flag) is stored in the storage device 205 of the MFP 200, for example. The manager setting reservation key is an example of allowing information for allowing storage of a setting value of the MFP 200 in the PC terminal 100.

According to the second embodiment, the condition of the manager setting reservation state of the MFP 200 and transmission of the manager setting reservation key are managed by the control unit realized by the CPU 201 of the MFP 200, for example.

Third Embodiment

According to a third embodiment, hardware structures of the PC terminal 100 and the MFP 200 of an image processing system may be similar to the corresponding hardware structures in the first embodiment, wherefore the same explanation is not repeated herein.

<Outline of Image Processing System>

According to the image processing system in the third embodiment, a process for receiving a setting value only from the single PC terminal 100 as described in the process of the image processing system according to the second embodiment is executed for each setting item of the MFP 200. In other words, the MFP 200 transmits a manager setting reservation key to the PC terminal 100 for each setting item. FIG. 12 is a view illustrating an example of a management table showing manager setting reservation keys managed by the MFP 200 according to the third embodiment. This management table is stored in the storage device 205, for example.

The table illustrated in FIG. 12 contains registration of information about a plurality of manager setting reservation keys indicated as "Key 1", "Key 2", and up to "Key N". Each of the manager setting reservation keys is associated with one or more setting items of the MFP 200 as indicated by "Reservation setting item 1" through "Reservation setting item M". For example, "Key 1" is associated with three setting items "Setting A", "Setting B", and "Setting C". On the other hand, "Key 2" is associated with two setting items "Setting L" and "Setting M".

When receiving a request for setting the setting values of the three setting items "Setting A", "Setting B", and "setting C" from the first PC terminal 100 (terminal A) during execution of a job, the MFP 200 registers the three setting items in the management table illustrated in FIG. 12 in association with one manager setting reservation key ("Key 1"). Then, the MFP 200 transmits this manager setting reservation key to the PC terminal 100 (terminal A). The terminal A having received the manager setting reservation key stores the setting values of the three setting items "Setting A", "Setting B", and "Setting C" together with the manager setting reservation key ("Key 1"). The terminal A receives a change of the setting values of these setting items until the terminal A transmits the three setting items "Setting A", "Setting B", and "Setting C" to the MFP 200, and stores the changed setting values.

When receiving a request for setting the setting values of the three setting items "Setting A", "Setting L", and "Setting M" from the second PC terminal 100 (terminal B) during execution of a job, the MFP 200 registers the two setting items "Setting L" and "Setting M" in the management table illustrated in FIG. 12 in association with the one manager setting reservation key ("Key 2"), other than the setting item "Setting A" corresponding to the target of the manager setting reservation key ("Key 1") already transmitted to the terminal A. Then, the MFP 200 transmits this manager setting reservation key to the PC terminal 100 (terminal B). Based on this key, the terminal B deletes the input setting value for the setting item "Setting A", and stores the setting values of the remaining two setting items "Setting L" and "Setting M" together with the manager setting reservation key ("Key 2"). The terminal B receives a change of the setting values of these setting items until the terminal B transmits the two setting items "Setting L" and "Setting M" to the MFP 200, and stores the changed setting values.

<Flow of Processes>

Figure 13:
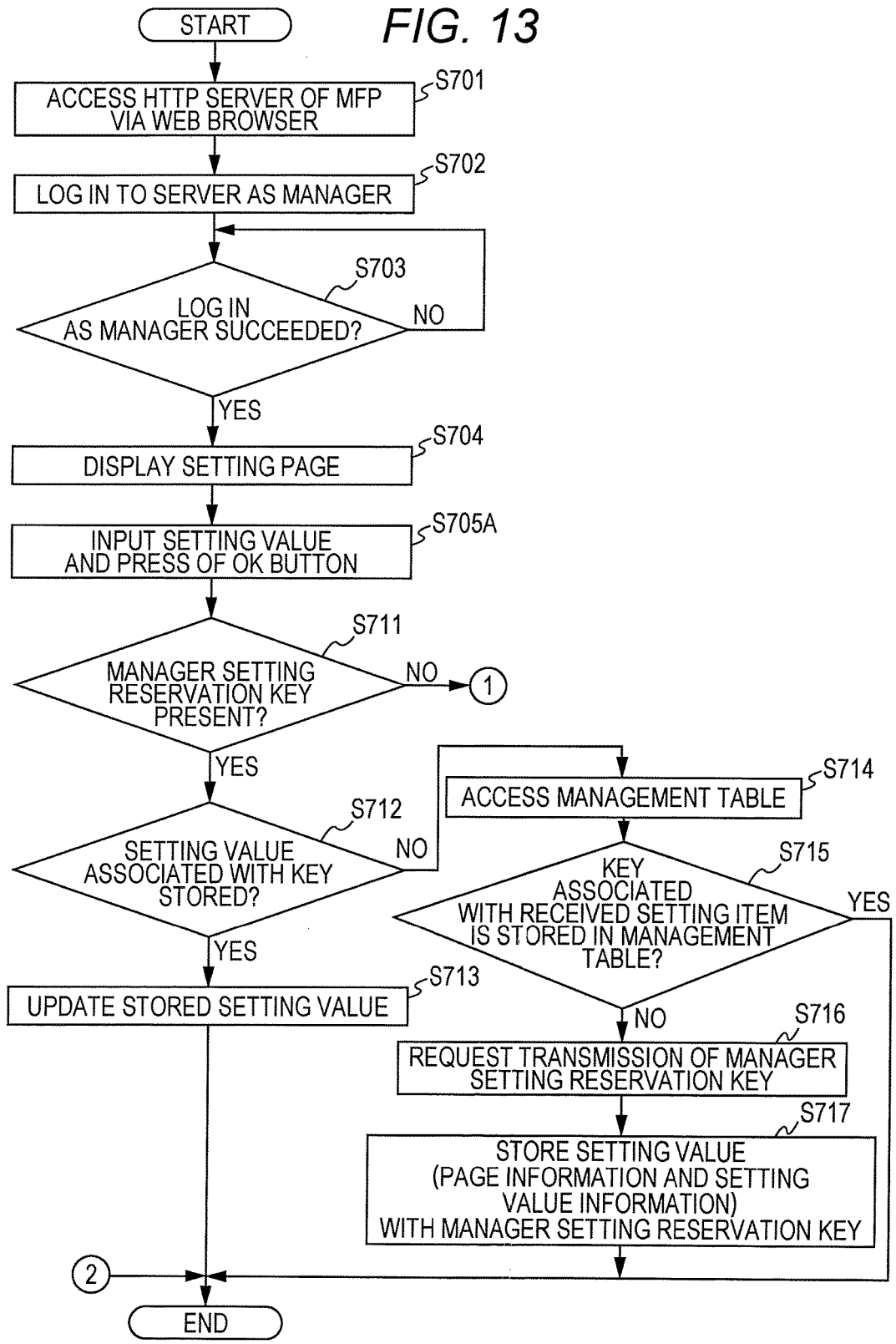
FIG. 13 is a flowchart of a process executed by a PC terminal according to the third embodiment for receiving a setting value.
Figure 14:
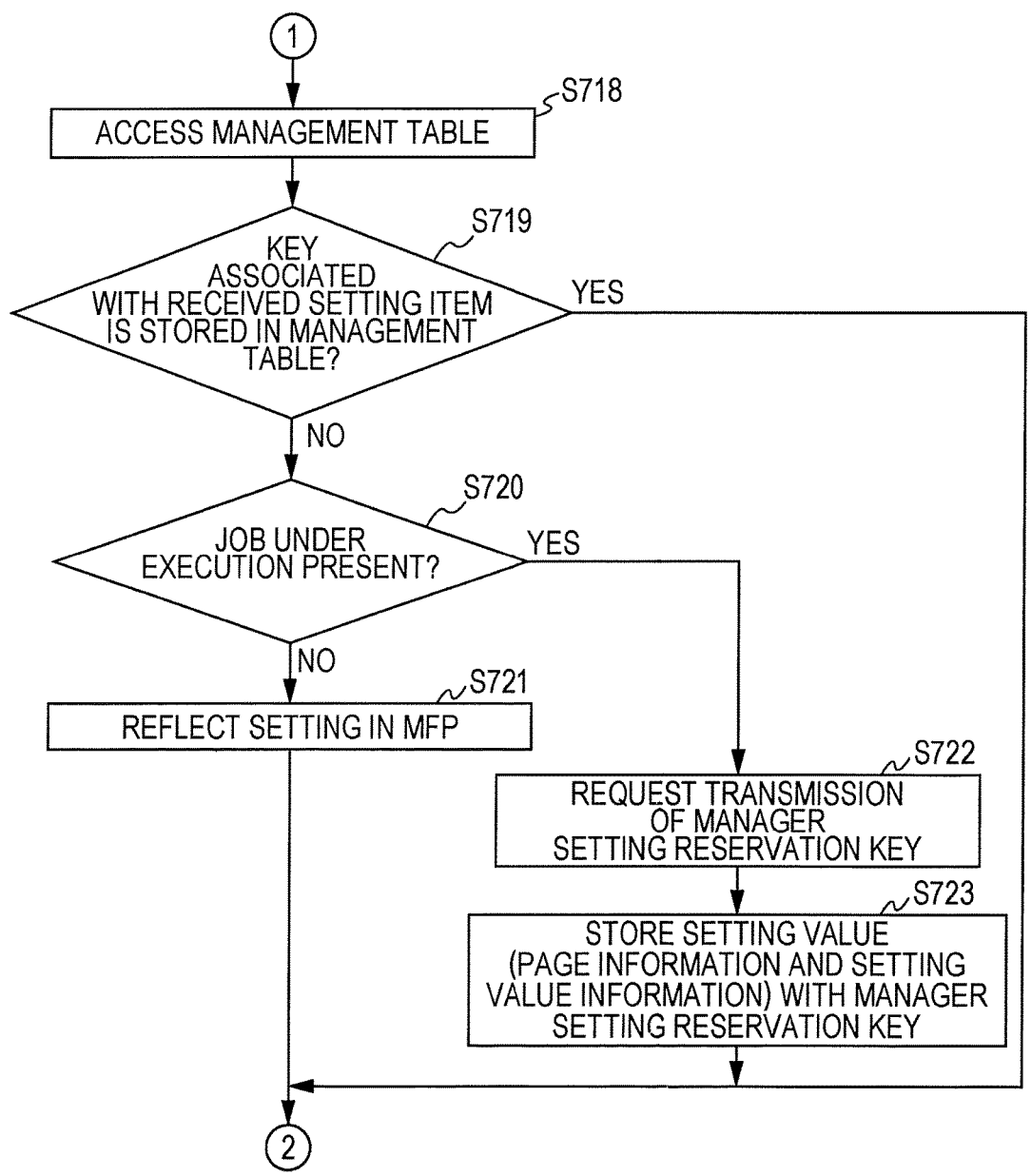
FIG. 14 is a flowchart of the process executed by the PC terminal according to the third embodiment for receiving the setting value.

FIGS. 13 and 14 are flowcharts of a process executed by the PC terminal 100 for receiving a setting value.

Initially referring to FIG. 13, the CPU 101 executes control in steps S701 through S704 similarly to the process illustrated in FIG. 5 according to the first embodiment. More specifically, the CPU 101 accesses the server in step S701, tries log-in to the system as a manager in step S702, and determines whether or not log-in has succeeded as a manager in step S703. When it is determined that the log-in has succeeded, the CPU 101 advances the control to step S704. The CPU 101 displays on the display 104 a page through which a setting value is input. Thereafter, the control advances to step S705A.

In step S705A, the CPU 101 receives a setting value input to the page displayed in step S704, and receives an operation for confirming the setting value (such as press of OK button). Then, the control advances to step S711.

In step S711, the CPU 101 determines whether or not a manager setting reservation key has been stored in the PC terminal 100 on which the corresponding CPU 101 is mounted. When it is determined that the corresponding key has been stored, the CPU 101 advances the control to step S712. When it is determined that this key has not been stored, the CPU 101 advances the control to step S718 (FIG. 14).

In step S712, the CPU 101 determines whether or not the setting value has been stored in the PC terminal 100 on which the corresponding CPU 101 is mounted for the setting item associated with the setting value received in step S705. When it is determined that the setting value has been stored, the CPU 101 advances the control to step S713. When it is determined that the setting value has not been stored, the CPU 101 advances the control to step S714.

In step S713, the CPU 101 updates the setting value already stored to the setting value received in step S705. Then, the process illustrated in FIG. 13 ends. According to this structure, for example, the PC terminal 100 updates the setting value for the "Setting A" to the new setting value when the new setting value for the "Setting A" is received in a state that the manager setting reservation key for the "Setting A" and the setting value for the "Setting A" have been stored in the PC terminal 100.

In step S714, the CPU 101 accesses the management table of the MFP 200 illustrated in FIG. 12. Then, the control advances to step S715.

In step S715, the CPU 101 determines whether or not the manager setting reservation key has been set in the management table for the setting item associated with the setting value received in step S705. When it is determined that the manager setting reservation key has been set for the setting item (step S715: YES), the CPU 101 ends the process illustrated in FIG. 13 in this condition. More specifically, when the manager setting reservation key is already set for the different PC terminal 100 concerning the setting item associated with the setting value received in step S705, the CPU 101 ends the process in FIG. 13 without storing this setting value. In this case, the CPU 101 may display on the display 104 a message of a notification that the input setting value is deleted without storage. For example, this message may say, "Setting is not allowed. Setting value corresponds to item already reserved by other manager."

When it is determined that the manager setting reservation key associated with the setting item has not been set in the management table in step S715 (Step S715: NO), the CPU 101 advances the control to step S716.

In step S716, the CPU 101 requests the MFP 200 to transmit a manager setting reservation key for the corresponding setting item. Then, the control advances to step S717.

In response to the request in step S716, the MFP 200 generates a manager setting reservation key associated with the corresponding setting item, registers the key in the management table, and transmits the key to the PC terminal 100.

In step S717, the CPU 101 receives the manager setting reservation key transmitted from the MFP 200, and stores the key in the PC terminal 100 together with the setting value received in step S705. Storage of the information in step S717 is realized by using the function of the web browser (such as Web Storage), for example. Then, the process illustrated in FIG. 13 ends.

Referring to FIG. 14, the CPU 101 accesses the management table of the MFP 200 illustrated in FIG. 12 in step S718. Then, the control advances to step S719.

In step S719, the CPU 101 determines whether or not the manager setting reservation key has been set in the management table for the setting item received in step S705. When it is determined that the manager setting reservation key has been already set for the corresponding setting item (step S719: YES), the CPU 101 ends the process illustrated in FIG. 13 in this condition. More specifically, when the manager setting reservation key is already set for the different PC terminal 100 concerning the setting item of the setting value received in step S705, the CPU 101 ends the process in FIG. 13 without storing the setting value similarly to step S715.

When it is determined that the manager setting reservation key has not been set yet for the corresponding setting item in step S719 (step S719: NO), the CPU 101 advances the control to step S720.

In step S720, the CPU 101 determines whether or not the MFP 200 is in a state not preferable for setting a new setting value. The CPU 101 requests the MFP 200 to give a notification about the state of the MFP 200 in step S705A. In response to this request, the MFP 200 notifies the PC terminal 100 about the state of the MFP 200. In step S720, the CPU 101 makes the foregoing determination based on the notification. When it is determined that the MFP 200 is in a state not preferable for setting a new setting value (such as a state that the MFP 200 is executing a job), the CPU 101 advances the control to step S722. When it is determined that the MFP 200 is in a state preferable for setting a new job (such as a state that the MFP 200 is not executing a job), the CPU 101 advances the control to step S721.

In step S721, the CPU 101 allows the setting value received in step S705 to be reflected in the MFP 200. After completion of this step, the process illustrated in FIGS. 13 and 14 ends. The control in step S721 is realized by a CGI process, for example.

In step S722, the CPU 101 requests the MFP 200 to transmit a manager setting reservation key for the setting item associated with the setting value received in step S705. Then, the control advances to step S723.

In response to the request in step S722, the MFP 200 generates a manager setting reservation key associated with the corresponding setting item, registers the key in the management table, and transmits the key to the PC terminal 100.

In step S723, the CPU 101 receives the manager setting reservation key transmitted from the MFP 200, and stores the key in the PC terminal 100 together with the setting value received in step S705. Storage of the information in step S717 is realized by using the function of the web browser (such as Web Storage), for example. After completion of this step, the process illustrated in FIGS. 13 and 14 ends.

According to the third embodiment, the CPU 101 again executes the process described with reference to FIG. 11 after completion of the process illustrated in FIGS. 13 and 14. More specifically, the manager setting reservation key and the setting value stored in the PC terminal 100 are transmitted to the MFP 200 when the MFP 200 shifts to a state preferable for setting anew setting value. The setting value thus transmitted is set for the MFP 200. In this case, the corresponding manager setting reservation key information is deleted from the management table. Moreover, the manager setting reservation key and the setting value are deleted from the PC terminal 100.

According to the third embodiment, the single PC terminal 100 capable of storing a setting value of the MFP 200 in a state not preferable for setting a new setting value is specified for each setting item based on a manager setting reservation key. On the other hand, the PC terminal 100 is not allowed to request setting of a setting value of the MFP 200 for a setting item when the PC terminal 100 does not store a manager setting reservation key for the corresponding setting item in a condition that the MFP 200 is in a manager setting reservation state.

In the processes illustrated in FIGS. 13 and 14, the CPU 101 accesses the management table stored in the MFP 200 insteps S714 and S718 to make determinations in steps S715 and S719. Alternatively, the CPU 101 may request the MFP 200 to make these determinations, instead of executing this control on the CPU 101 side. In this case, the CPU 101 transmits to the MFP 200 a setting item associated with a setting value received in step S705, and inquires whether or not a manager setting reservation key associated with the corresponding setting item has been set in the management table. The MFP 200 determines whether or not such a management setting reservation key has been set in the management table, and transmits a determination result to the PC terminal 100. Then, the CPU 101 advances the control based on the result transmitted from the MFP 200, in place of the determination results in steps S715 and S719.

According to an embodiment of the present disclosure, the information processing device stores a setting value received by the receipt unit in the storage unit when the image forming apparatus is in a state not allowed for setting a setting value, and requests the image forming apparatus to set the setting value stored in the storage unit when the image forming apparatus shifts to a state allowed for setting a setting value at a later time. Accordingly, a user who has tried input of a setting value to the image forming apparatus in a state not allowed for setting a setting value is not required to again input the setting value of the image forming apparatus when the image forming apparatus shifts to a state allowed for setting a setting value.

Although the present invention has been described and illustrated in detail, it is clearly understood that the same is by way of illustrated and example only and is not to be taken by way of limitation, the scope of the present invention being interpreted by terms of the appended claims. It is therefore intended that all modifications and changes within the sense and range equivalent to the claims are included in the scope of the present invention. It is further intended that the modes of the present invention described in the respective embodiments and modified examples may be practiced either independently or in combination within an allowable range.

What is claimed is:

1. An information processing device comprising:
a communicator that communicates with an image forming apparatus;
a receiver that receives a setting value of the image forming apparatus; and
a hardware processor configured to:
receive information about a state of the image forming apparatus from the image forming apparatus via the communicator to change a setting of the setting value; and
store the setting value received by the receiver in a memory when the received information indicates that the image forming apparatus is operable and is in a state not allowed for setting a setting value, and request the image forming apparatus to set the setting value stored in the memory when the image forming apparatus shifts to a state allowed for setting a setting value.

2. The information processing device according to claim 1, wherein
the communicator is capable of receiving information for allowing storage of the setting value from the image forming apparatus, and
the hardware processor discards the setting value received by the receiver without storing the setting value in the memory when the information for allowing storage of the setting value is not received from the image forming apparatus in a condition that the image forming apparatus is in a state not allowed for setting a setting value.

3. The information processing device according to claim 1, wherein
the communicator is capable of receiving information for allowing storage of the setting value from the image forming apparatus, and
when the setting value contains a setting value associated with a setting item for which information for allowing storage of this setting item is not received from the image forming apparatus, in a condition that the image forming apparatus is in a state not allowed for setting a setting value, the hardware processor discards the setting value of the setting item received by the receiver without storing the setting value in the memory.

4. The information processing device according to claim 1, wherein the hardware processor is configured to delete the setting value having been received by the receiver and stored in the memory when the image forming apparatus is requested to set the setting value after the storage of the setting value in the memory and a shift of the image forming apparatus to a state allowed for setting a setting value.

5. The information processing device according to claim 1, wherein the receiver is configured to give a notification that the setting value has been stored in the memory.

6. The information processing device according to claim 1, wherein the setting value is stored in the memory by a function of a web browser application program executed by the information processing device.

7. The information processing device according to claim 6, wherein the setting value is stored in the memory by a web storage function of the web browser application program.

8. The information processing device according to claim 6, wherein the setting value is stored in the memory by a cookie of the web browser application program.

9. The information processing device according to claim 1, wherein the state not allowed for setting a setting value is a state that the image forming apparatus is executing a job.

10. The information processing device according to claim 1, wherein the state not allowed for setting a setting value is a state that an operation for changing settings of the image forming apparatus is being input to the image forming apparatus.

11. The information processing device according to claim 1, wherein the state not allowed for setting a setting value is a state that an abnormal condition is being caused in the image forming apparatus.

12. A control method of an information processing device that includes a memory and communicates with an image forming apparatus via a communicator, the method comprising:
a step of receiving a setting value of the image forming apparatus;
a step of acquiring information about a state of the image forming apparatus from the image forming apparatus via the communicator to change a setting of the setting value; and
a step of storing the received setting value in the memory when the received information indicates that the image forming apparatus is operable and is in a state not allowed for setting a setting value, and requesting the image forming apparatus to set the setting value stored in the memory when the image forming apparatus shifts to a state allowed for setting a setting value.

13. A non-transitory recording medium storing a computer readable program executed by a computer that controls an information processing device including a memory and communicating with an image forming apparatus via a communicator, under the program the computer executing:
a step of receiving a setting value of the image forming apparatus;
a step of acquiring information about a state of the image forming apparatus from the image forming apparatus via the communicator to change a setting of the setting value; and
a step of storing the received setting value in the memory when the received information indicates that the image forming apparatus is operable and is in a state not allowed for setting a setting value, and requesting the image forming apparatus to set the setting value stored in the memory when the image forming apparatus shifts to a state allowed for setting a setting value.

14. The non-transitory recording medium storing a computer readable program according to claim 13, wherein the setting value is discarded without storage in the memory when information for allowing storage of the setting value is not received from the image forming apparatus in a condition that the image forming apparatus is in a state not allowed for setting a setting value.

15. The non-transitory recording medium storing a computer readable program according to claim 13, wherein when the setting value contains a setting value associated with a setting item for which information for allowing storage of this setting item is not received from the image forming apparatus, in a condition that the image forming apparatus is in a state not allowed for setting a setting value, the setting value of the setting item is discarded without storing the setting value in the memory.

16. The non-transitory recording medium storing a computer readable program according to claim 13, under the program the computer further executing a step of deleting the setting value having been stored in the memory when the image forming apparatus is requested to set the setting value stored in the memory.

17. The non-transitory recording medium storing a computer readable program according to claim 13, under the program the computer further executing a step of giving a notification that the setting value has been stored in the memory.

18. The non-transitory recording medium storing a computer readable program according to claim 13, wherein the setting value is stored in the memory by a function of a web browser application program executed by the information processing device.

19. The non-transitory recording medium storing a computer readable program according to claim 18, wherein the setting value is stored in the memory by a web storage function of the web browser application program.

20. The non-transitory recording medium storing a computer readable program according to claim 18, wherein the setting value is stored in the memory by a cookie of the web browser application program.

21. The non-transitory recording medium storing a computer readable program according to claim 13, wherein the state not allowed for setting a setting value is a state that the image forming apparatus is executing a job.

22. The non-transitory recording medium storing a computer readable program according to claim 13, wherein the state not allowed for setting a setting value is a state that an operation for changing settings of the image forming apparatus is being input to the image forming apparatus.

23. The non-transitory recording medium storing a computer readable program according to claim 13, wherein the state not allowed for setting a setting value is a state that an abnormal condition is being caused in the image forming apparatus.

24. An image processing system comprising:
an image forming apparatus; and
an information processing device capable of communicating with the image forming apparatus, wherein
the information processing device includes
a first memory,
a receiver that receives a setting value of the image forming apparatus, and
a first hardware processor configured to:
acquire information about a state of the image forming apparatus from the image forming apparatus to change a setting of the setting value, and
store the setting value received by the receiver in the first memory when the received information indicates that the image forming apparatus is operable and is in a state not allowed for setting a setting value, and request the image forming apparatus to set the setting value stored in the first memory when the image forming apparatus shifts to a state allowed for setting a setting value, and
the image forming apparatus includes a second hardware processor configured to transmit information concerning the state of the image forming apparatus to the first hardware processor of the information processing device, which information indicates whether or not the image forming apparatus is operable and is in a state not allowed for setting a setting value.

25. The image processing system according to claim 24, wherein
the first hardware processor inquires the image forming apparatus about the state of the image forming apparatus to change the setting value,
the second hardware processor is capable of communicating with two or more information processing devices, and transmitting allowing information in response to an inquiry from the first hardware processor of the information processing device for allowing only the single information processing device corresponding to a transmission source of the inquiry to store the setting value together with information indicating that the image forming apparatus is in a state not allowed for setting a setting value when the image forming apparatus is in a state not allowed for setting a setting value, and
the first hardware processor stores the setting value in the first memory in a condition that the allowing information has been received when information transmitted from the second hardware processor indicates that the image forming apparatus is in a state not allowed for setting a setting value, and discards the setting value without storing the setting value in the first memory when the allowing information is not received.

26. The image processing system according to claim 24, wherein
the first hardware processor inquires the image forming apparatus about the state of the image forming apparatus to change the setting value,
the second hardware processor is capable of communicating with two or more information processing devices, and transmitting allowing information in response to an inquiry from the first hardware processor about setting of a setting value of a first type setting item for allowing only the single information processing device corresponding to a transmission source of the inquiry to store the setting value of the first type setting item when the image forming apparatus is in a state not allowed for setting a setting value, and
the first hardware processor stores the setting value of the first type setting item in the first memory in a condition that the allowing information concerning the first type setting item has been received when information transmitted from the second hardware processor indicates that the image forming apparatus is in a state not allowed for setting the setting value of the first type setting item, and discards the setting value without storing the setting value of the first type setting item in the first memory when the allowing information concerning the first type setting item is not received.

27. The image processing system according to claim 25, wherein
the image forming apparatus includes a second memory, and
the second hardware processor is configured to store reservation information indicating that the allowing information has been transmitted to the information processing device, and delete from the second memory the reservation information corresponding to a request for setting the setting value stored in the first memory when the request is received from the information processing device to which the allowing information has been transmitted.

28. The image processing system according to claim 24, wherein the first hardware processor is configured to delete the setting value having been stored in the first memory when the image forming apparatus is requested to set the setting value stored in the first memory.

29. The image processing system according to claim 24, wherein the first hardware processor is configured to give a notification that the setting value has been stored in the memory.

30. The image processing system according to claim 24, wherein the setting value is stored in the memory by a function of a web browser application program executed by the information processing device.

31. The image processing system according to claim 30, wherein the setting value is stored in the memory by a web storage function of the web browser application program.

32. The image processing system according to claim 30, wherein the setting value is stored in the memory by a cookie of the web browser application program.

33. The image processing system according to claim 24, wherein the state not allowed for setting a setting value is a state that the image forming apparatus is executing a job.

34. The image processing system according to claim 24, wherein the state not allowed for setting a setting value is a state that an operation for changing settings of the image forming apparatus is being input to the image forming apparatus.

35. The image processing system according to claim 24, wherein the state not allowed for setting a setting value is a state that an abnormal condition is being caused in the image forming apparatus.

* * * * *